(12) United States Patent
Petrick et al.

(10) Patent No.: US 9,575,707 B2
(45) Date of Patent: Feb. 21, 2017

(54) MULTI-CHASSIS COORDINATED DISPLAY SYSTEM INCLUDING A CHASSIS ENCLOSURE THAT INCLUDES A BACKPLANE AND INFORMATION HANDLING SYSTEM (IHS) CONNECTORS

(71) Applicant: Dell Products L.P., Round Rock, TX (US)

(72) Inventors: Christopher Stephen Petrick, Cedar Park, TX (US); Deborah C. Russell, Austin, TX (US); Orin M. Ozias, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 14/181,482

(22) Filed: Feb. 14, 2014

(65) Prior Publication Data
US 2015/0235337 A1  Aug. 20, 2015

(51) Int. Cl.
*G06F 9/44* (2006.01)
*G06F 3/14* (2006.01)
*G06F 1/16* (2006.01)

(52) U.S. Cl.
CPC .............. *G06F 3/1423* (2013.01); *G06F 1/16* (2013.01); *G09G 2354/00* (2013.01); *G09G 2360/06* (2013.01)

(58) Field of Classification Search
CPC  G09G 5/003; G09G 2354/00; G09G 2360/06; G06F 1/16
USPC ........ 710/62–64, 14, 72–74; 345/7, 156, 1.2
See application file for complete search history.

(56) References Cited

U.S. PATENT DOCUMENTS

| | | | |
|---|---|---|---|
| 5,533,183 A | 7/1996 | Henderson, Jr. et al. | |
| D658,173 S | 4/2012 | Kim | |
| 8,369,693 B2* | 2/2013 | Zucker | H04N 13/0055 386/335 |
| 8,750,799 B2* | 6/2014 | Giles | H04W 4/206 455/41.2 |
| 9,159,165 B2* | 10/2015 | Stafford | G06T 19/006 |
| 9,229,612 B2* | 1/2016 | Chang | G06F 3/0481 |
| 2004/0174395 A1* | 9/2004 | Liu | G06F 1/1626 715/773 |
| 2013/0162515 A1* | 6/2013 | Prociw | G06F 1/1616 345/156 |

(Continued)

FOREIGN PATENT DOCUMENTS

GB         2479996 A  *  2/2011   ............... G06F 9/44

*Primary Examiner* — Tammara Peyton
(74) *Attorney, Agent, or Firm* — Haynes and Boone, LLP

(57) ABSTRACT

A multi-chassis coordinated display system a first chassis having a first display device located on the first chassis and a master screen agent. The master screen agent is configured to receive device information from a screen sub-agent that is located in a second chassis that includes a second display device. The master screen agent uses the device information to determine a first user interface screen for a user interface and a second user interface screen for the user interface, and sends the second user interface screen to the screen sub-agent. The master screen agent may then display the first user interface screen on the first display device while the screen sub-agent displays the second user interface screen on the second display device to provide a coordinated display of the user interface on the first display device and the second display device.

20 Claims, 20 Drawing Sheets

(56) References Cited

U.S. PATENT DOCUMENTS

2014/0232616 A1* 8/2014 Drake .................... H04B 5/02
                                                                         345/1.2

* cited by examiner

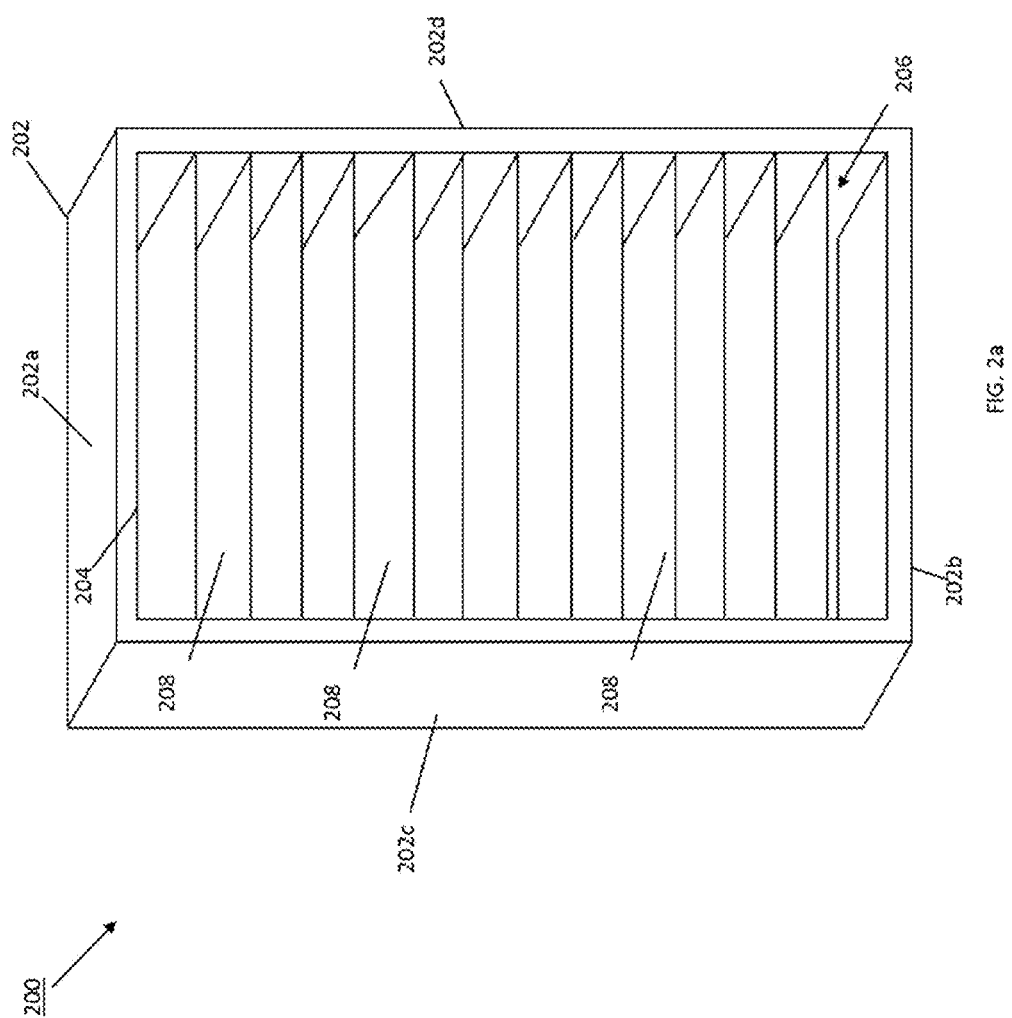

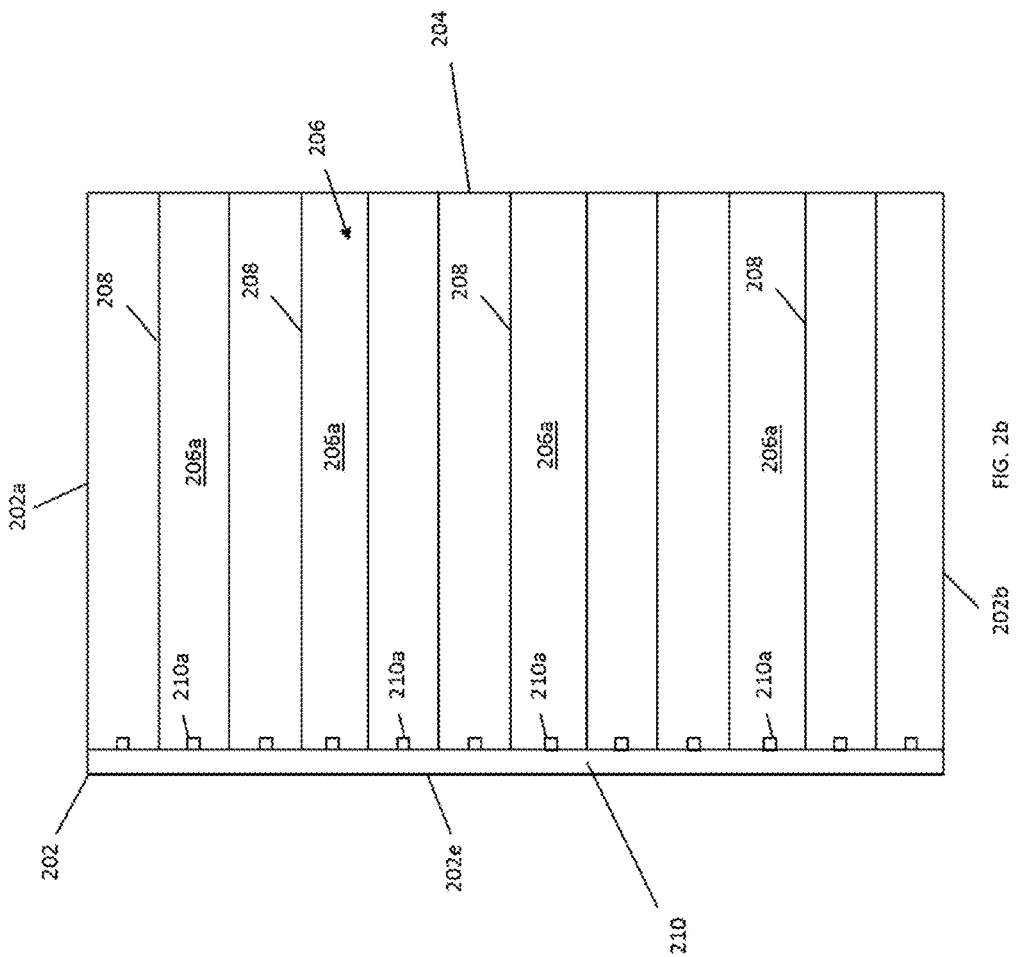

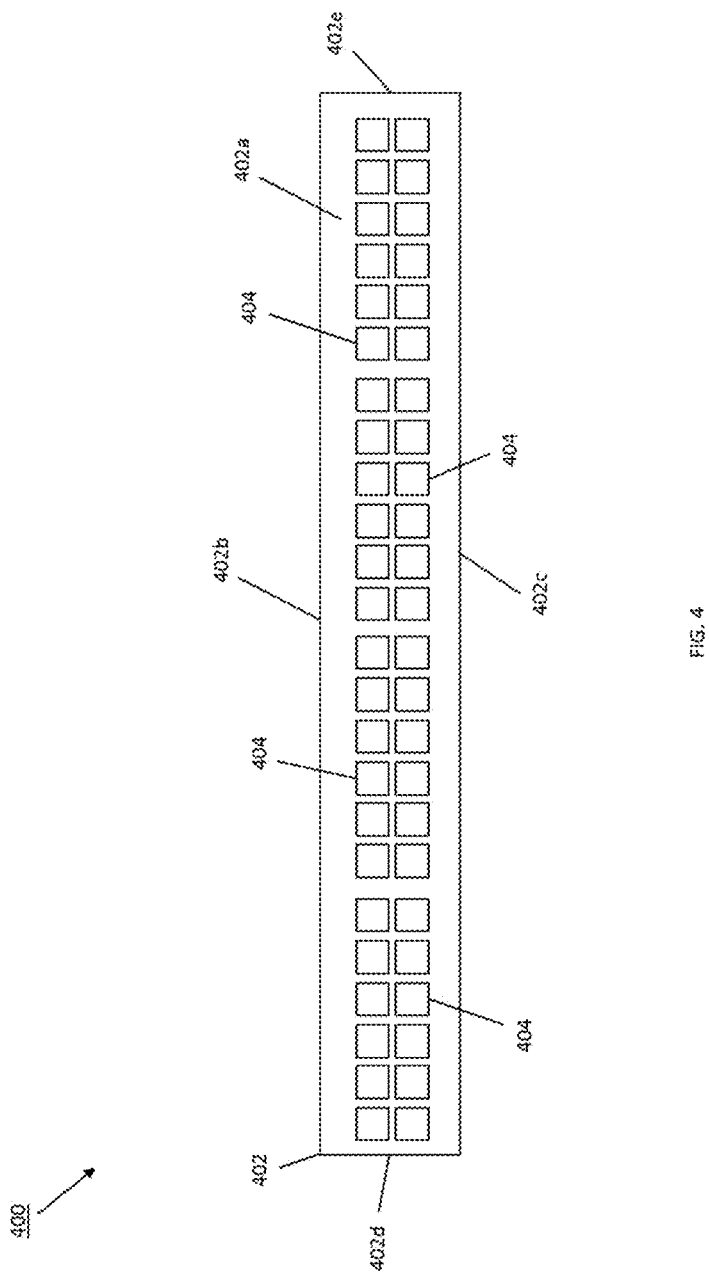

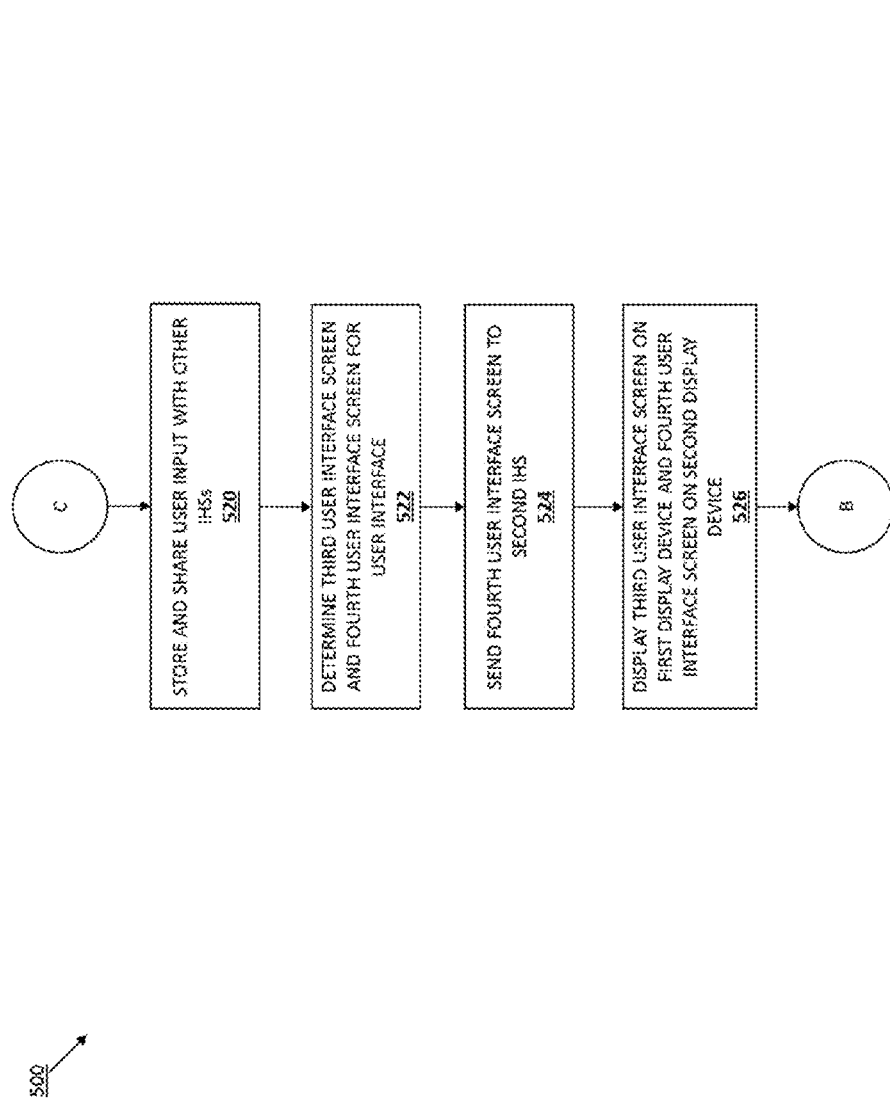

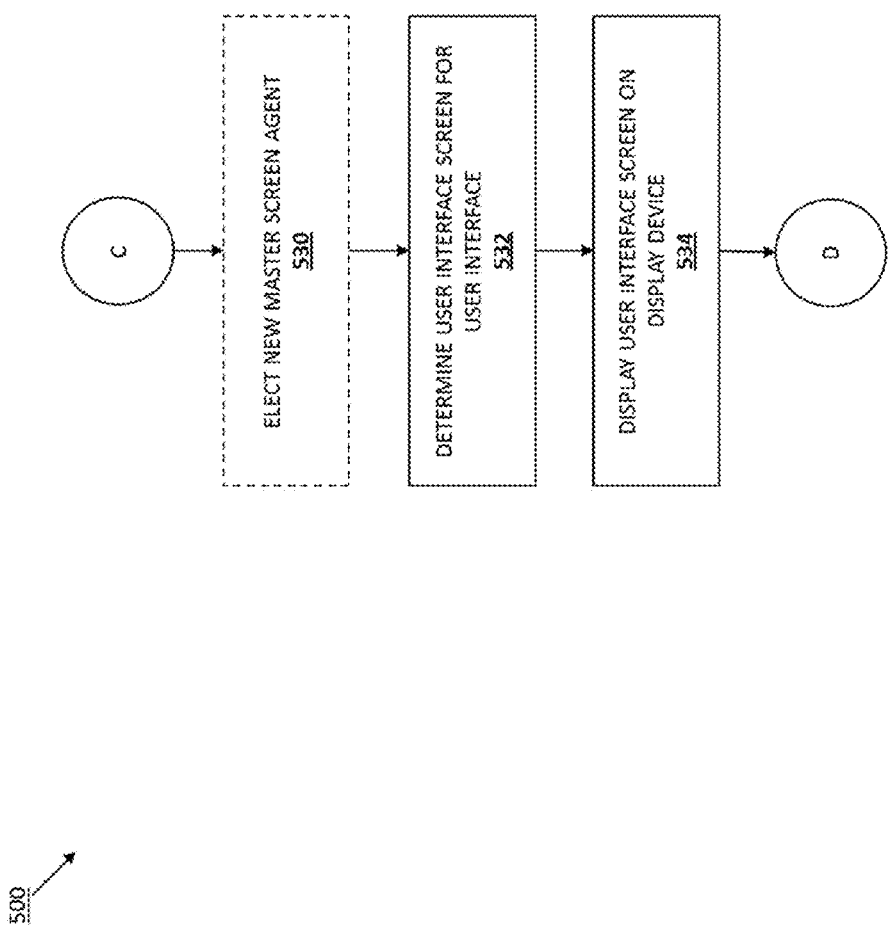

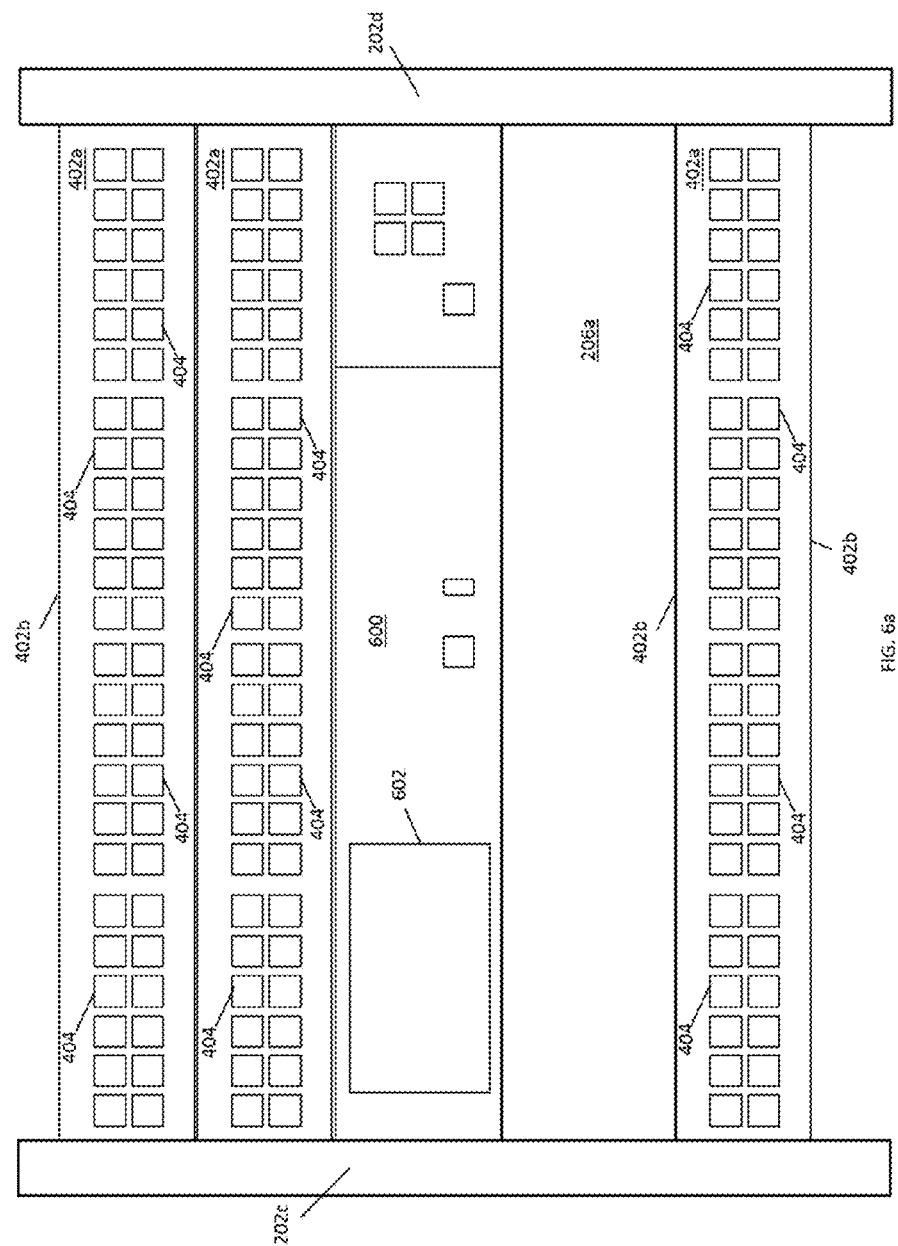

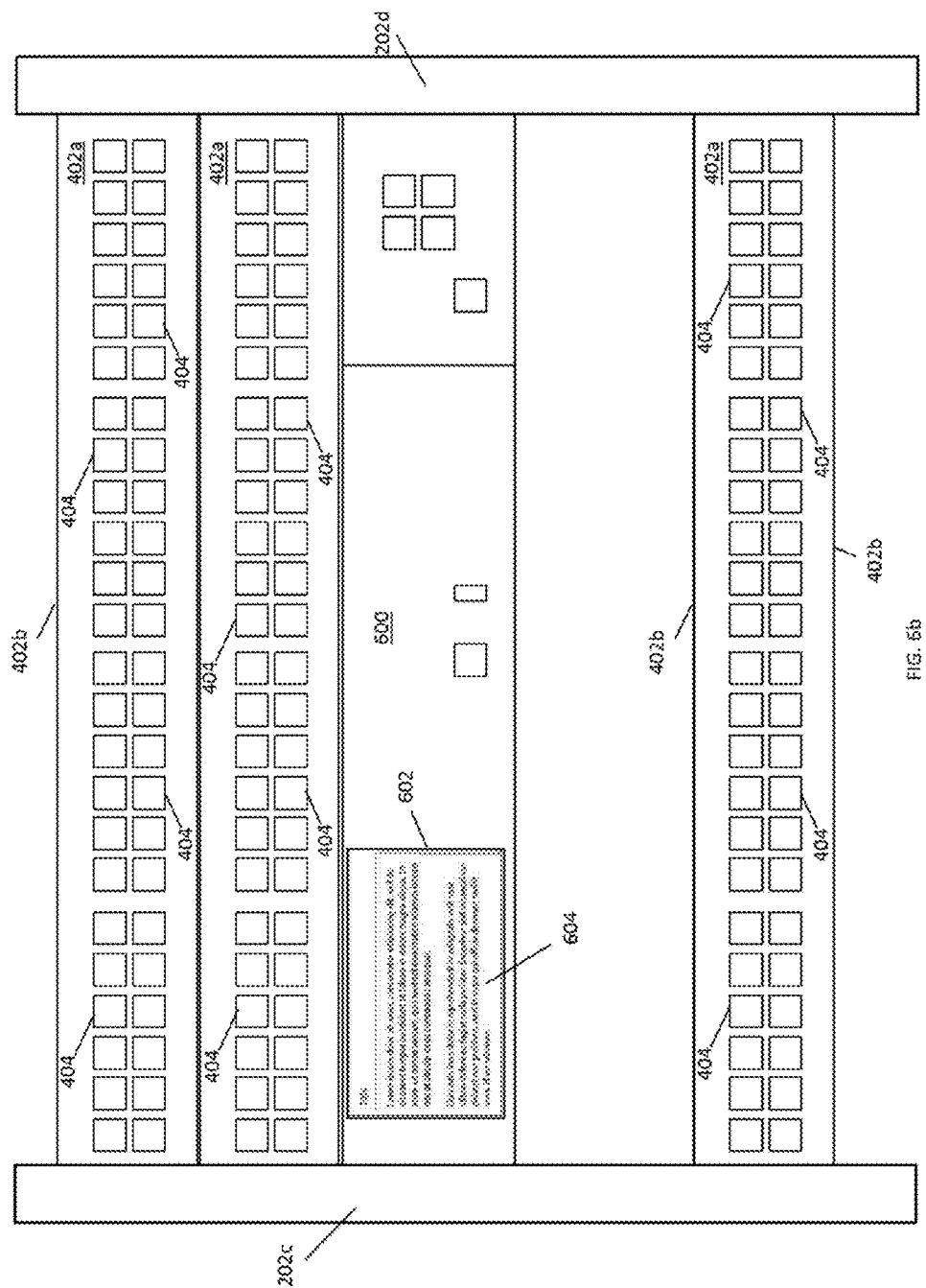

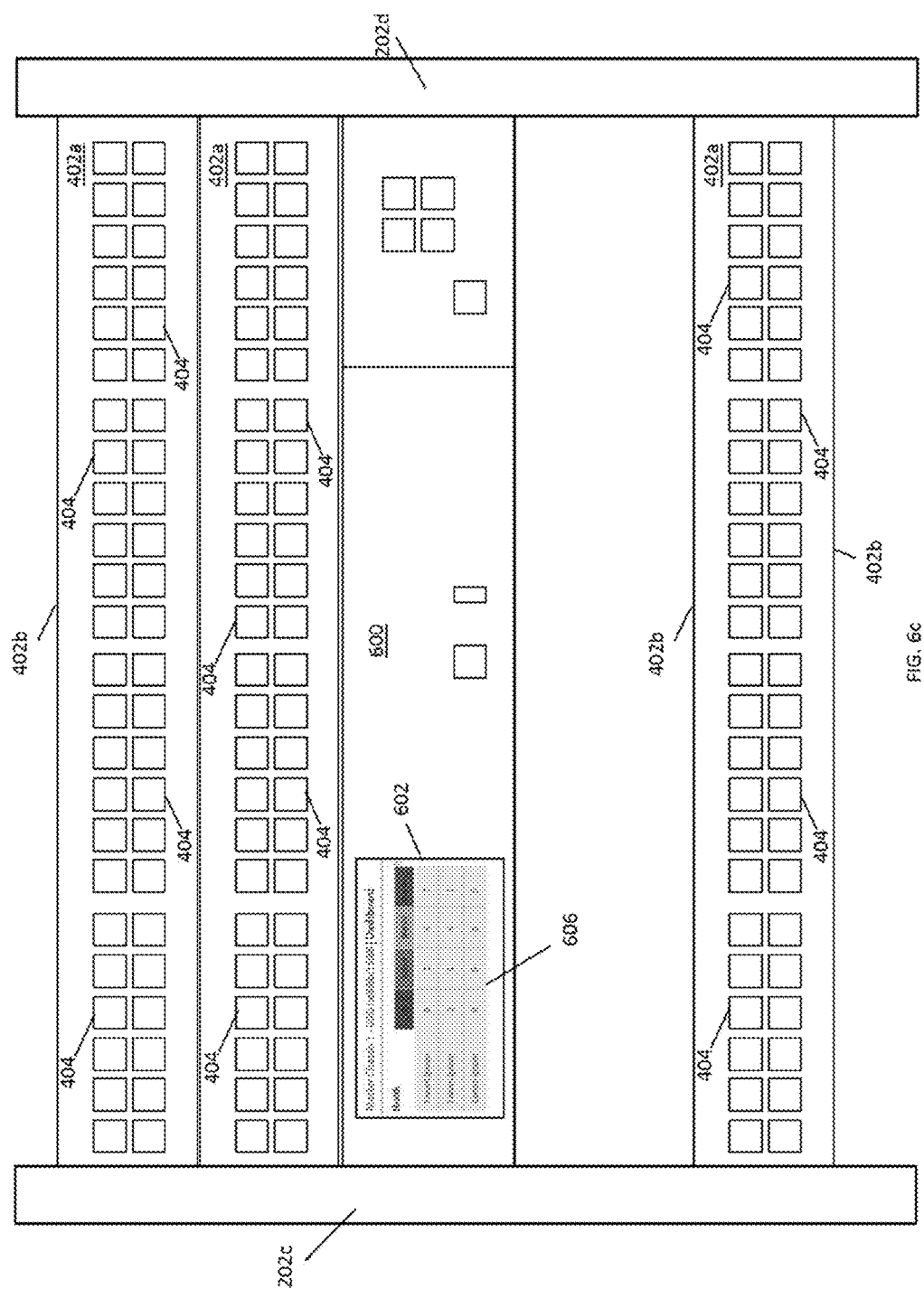

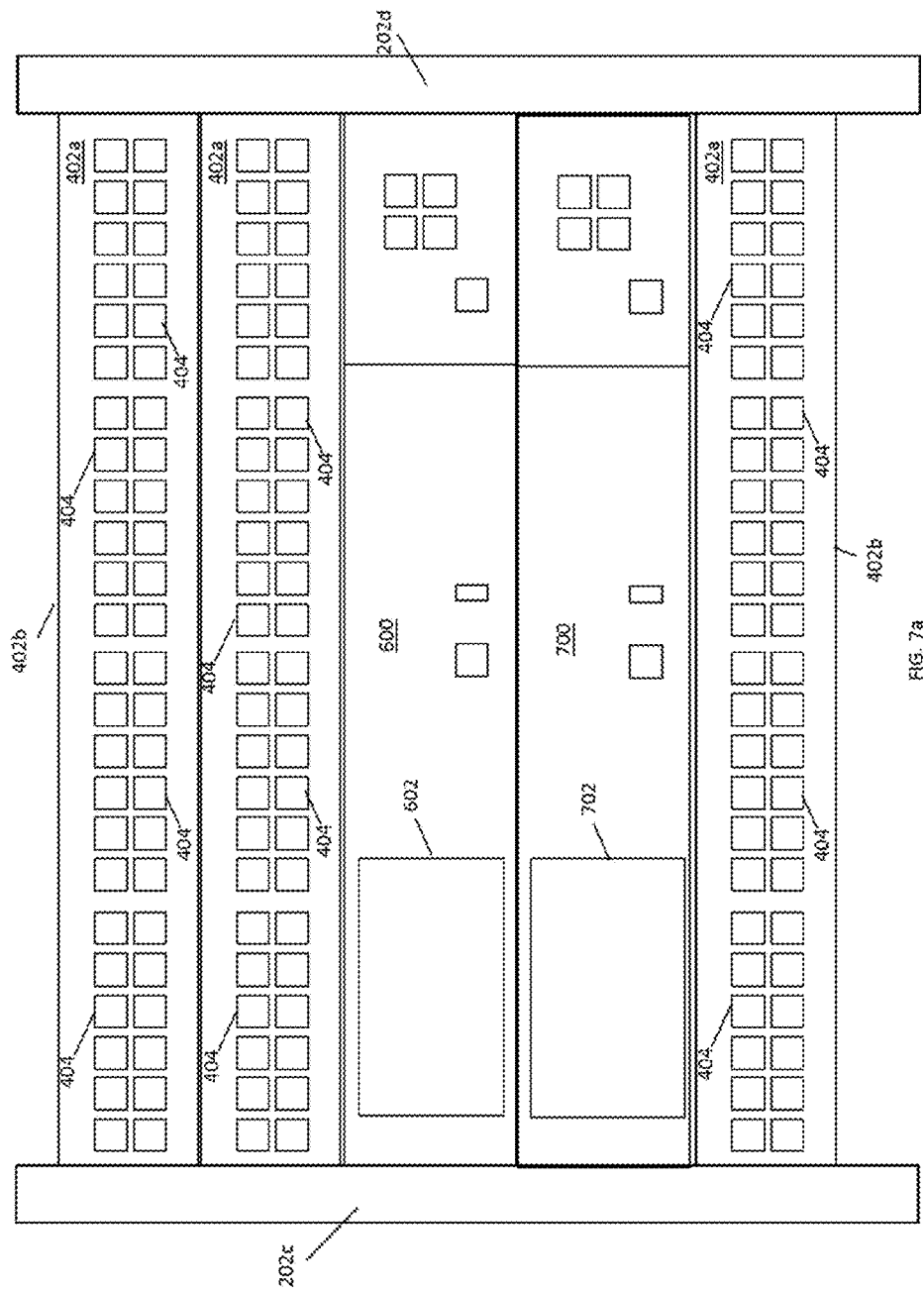

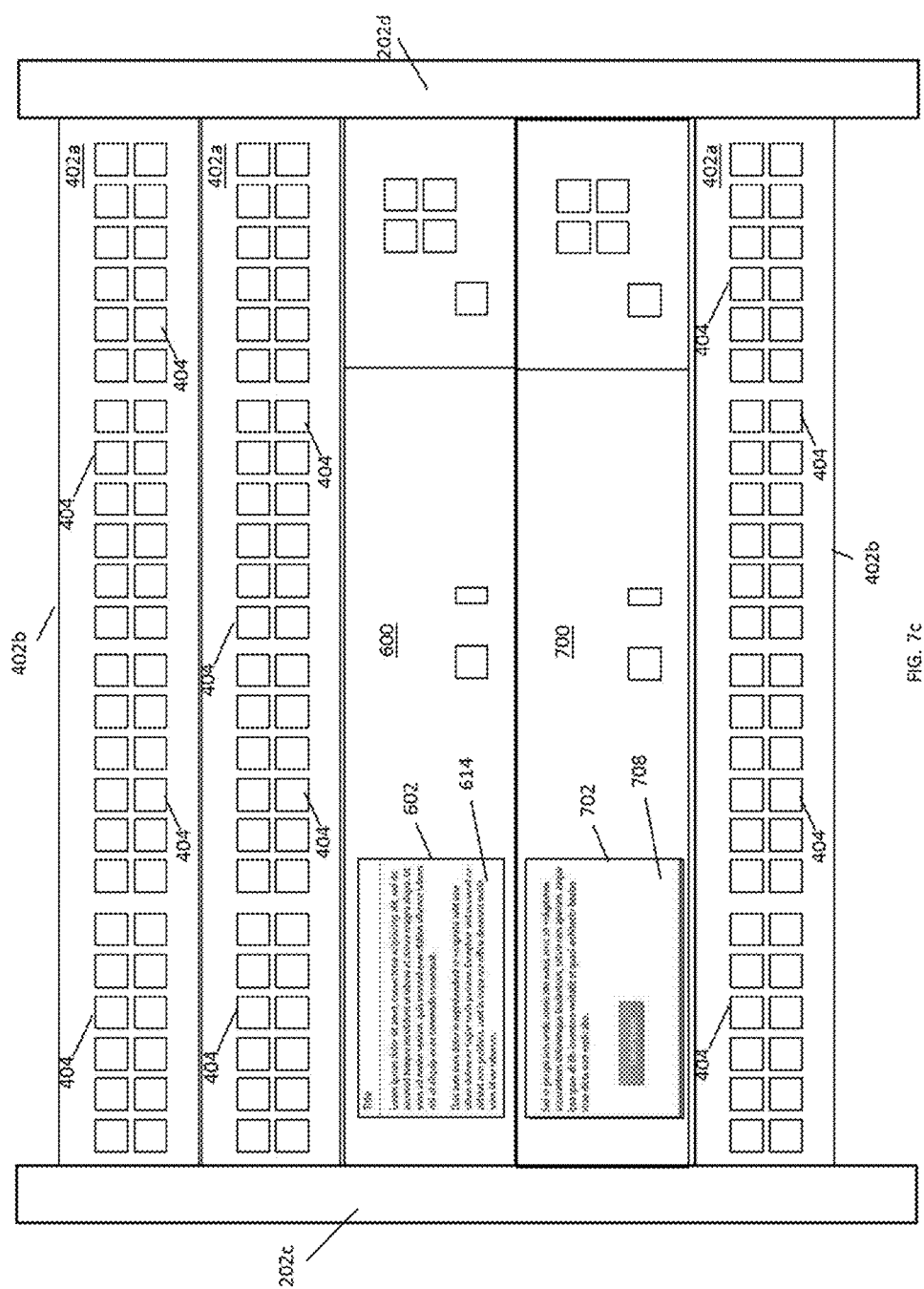

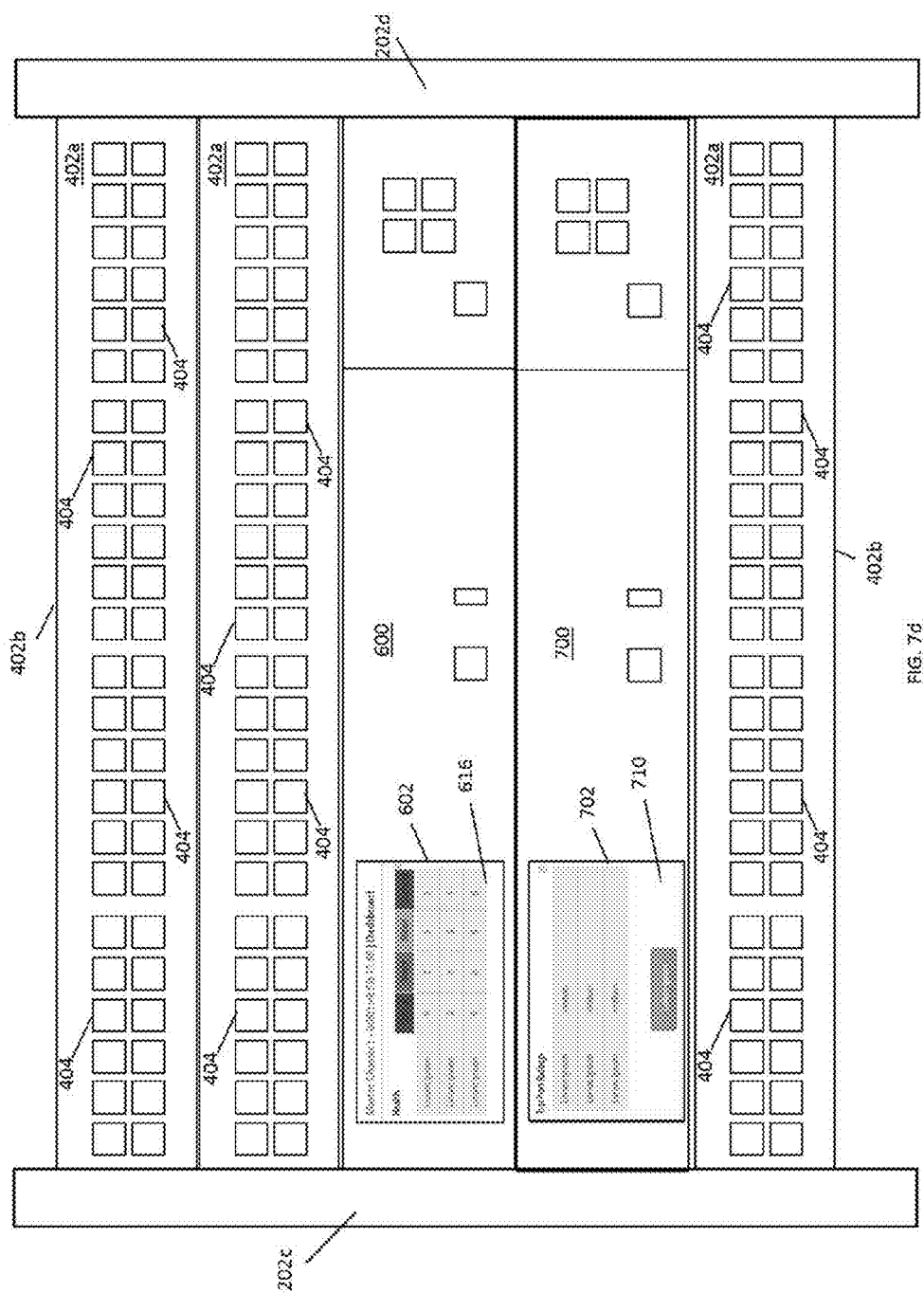

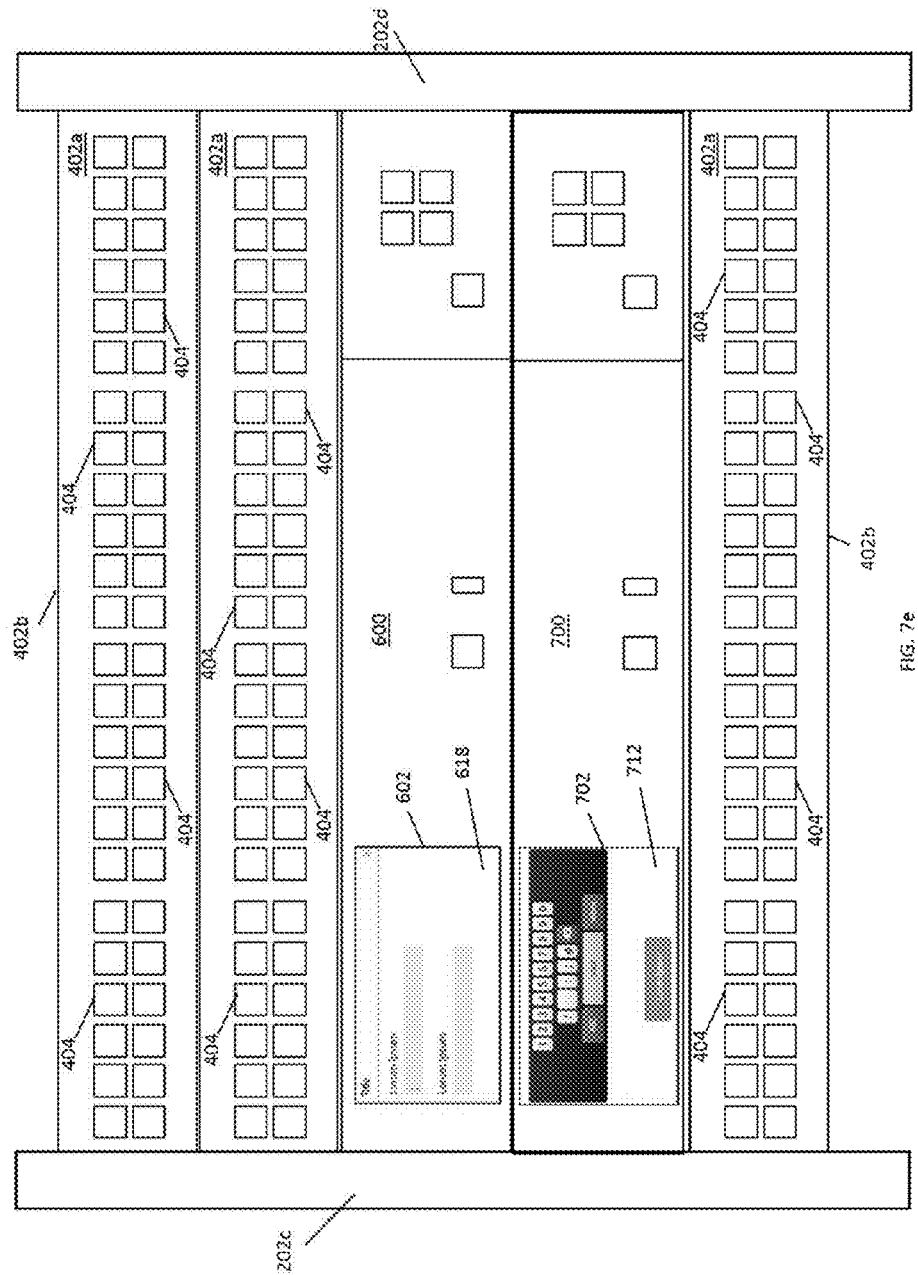

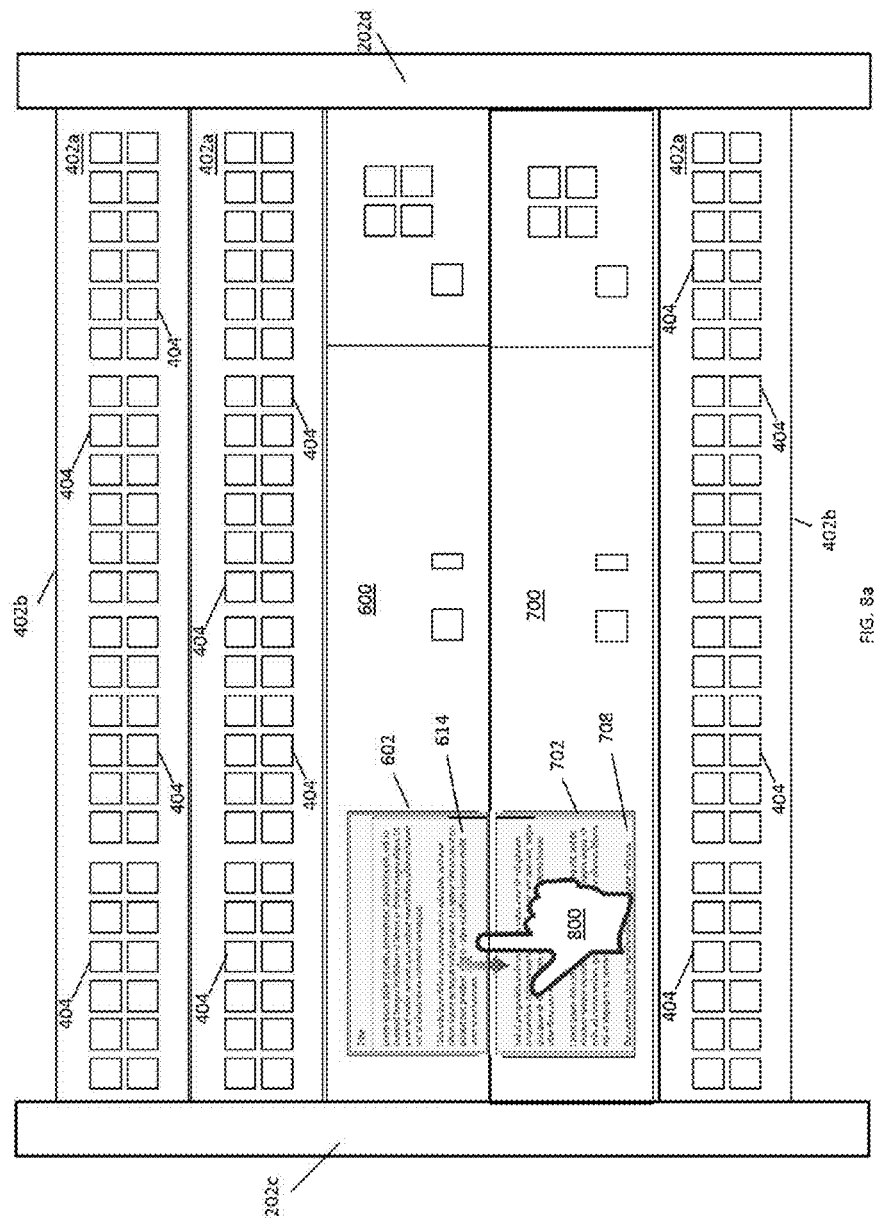

MULTI-CHASSIS COORDINATED DISPLAY SYSTEM INCLUDING A CHASSIS ENCLOSURE THAT INCLUDES A BACKPLANE AND INFORMATION HANDLING SYSTEM (IHS) CONNECTORS

BACKGROUND

The present disclosure relates generally to information handling systems (IHSs), and more particularly to a multi-IHS coordinated display system.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, data center IHSs such as switch IHSs, server IHSs, storage IHSs, and/or a variety of other data center IHSs known in the art, may include a display screen that provides for local user interaction with the IHS. For example, modular network switch IHSs exist that include a chassis that is configured to couple to an IHS chassis enclosure and that includes a Liquid Crystal Display (LCD) device on a front surface of the chassis that is accessible, when the chassis is coupled to the IHS enclosure, to a user to interact with the modular network switch IHS. However, when a plurality of the modular network switch IHSs are coupled to the same IHS enclosure, the LCD device on each modular network switch IHS operates independently from the other LCD devices on the other modular network switch IHSs, and can only provide interaction with its modular network switch IHS.

Accordingly, it would be desirable to provide a multi-IHS coordinated display system.

SUMMARY

According to one embodiment, an information handling system (IHS) includes an IHS enclosure; a slave IHS that is located in the IHS enclosure and that includes a slave display device and a slave processing system that provides a screen sub-agent; a master IHS that includes a master display device and that is located in the IHS enclosure adjacent the slave IHS such that the master display device is located adjacent the slave display device, wherein the master IHS includes a master processing system that provides a master screen agent that is coupled to the screen sub-agent and that is configured to: receive device information from the screen sub-agent; use the device information to determine a first user interface screen for a user interface and a second user interface screen for the user interface; send the second user interface screen to the screen sub-agent; and display the first user interface screen on the master display device; and wherein the screen sub-agent is configured to: display the second user interface screen on the slave display device, wherein the display of the first user interface screen by the master agent on the master display device and the display of the second user interface screen by the screen sub-agent on the slave display device results in a coordinated display of the user interface on the master display device and the slave display device.

BRIEF DESCRIPTION OF THE DRAWINGS

FIG. 2a is a perspective view illustrating an embodiment of an IHS enclosure.

FIG. 2b is a cut-away side view illustrating an embodiment of the IHS enclosure of FIG. 2a.

FIG. 3b is a schematic view illustrating an embodiment of the IHS of FIG. 3a.

FIG. 4 is a front view illustrating an embodiment of an IHS without a display device

FIG. 5b is a flow chart illustrating an embodiment of a portion of a method for multi-chassis coordinated display.

FIG. 5c is a flow chart illustrating an embodiment of a portion of a method for multi-chassis coordinated display.

FIG. 6a is a front view illustrating an embodiment of a master IHS of FIGS. 3a and 3b positioned in the IHS enclosure of FIGS. 2a and 2b.

FIG. 6b is a front view illustrating an embodiment of a display device on the master IHS of FIG. 6a displaying a first user interface.

FIG. 6c is a front view illustrating an embodiment of a display device on the master IHS of FIG. 6a displaying a second user interface.

FIG. 7a is a front view illustrating an embodiment of a slave IHS of FIGS. 3a and 3b positioned adjacent the master IHS in the IHS enclosure of FIG. 6a.

FIG. 7b is schematic view illustrating an embodiment of a slave IHS coupled to the master IHS in the IHS enclosure of FIG. 7a.

FIG. 7c is a front view illustrating an embodiment of display devices on the master IHS and slave IHS of FIG. 7a displaying the first user interface.

FIG. 7d is a front view illustrating an embodiment of display devices on the master IHS and slave IHS of FIG. 7a displaying the second user interface.

FIG. 7e is a front view illustrating an embodiment of display devices on the master IHS and slave IHS of FIG. 7a displaying the third user interface FIG. 8a is a front view illustrating an embodiment of a user input being provided on at least one of the display devices on the master IHS and slave IHS of FIG. 7c displaying the first user interface.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
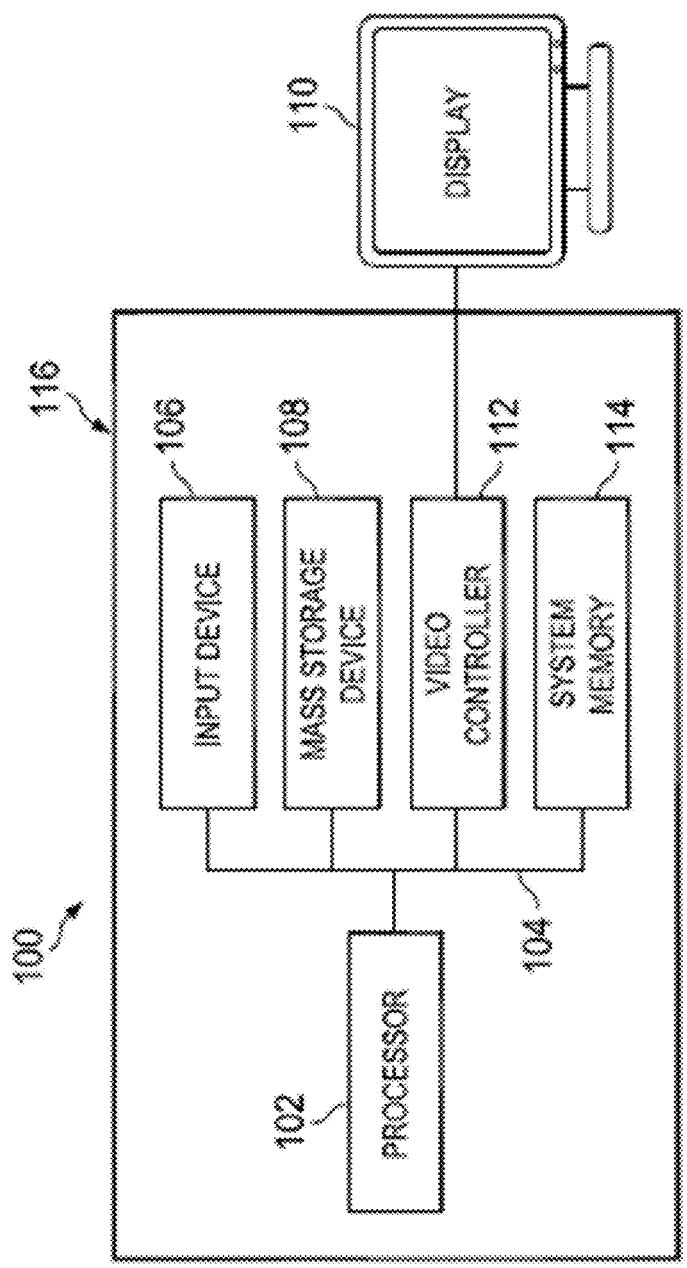
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIGS. 2a and 2b, an embodiment of an IHS/chassis enclosure 200 is illustrated. The IHS chassis enclosure 200 includes a base 202 having a top wall 202a, a bottom wall 202b located opposite the base 202 from the top wall 202a, a pair of opposing side walls 202c and 202d located opposite the base 202 from each other and extending between the top wall 202a and the bottom wall 202b, and a rear wall 202 extending between the top wall 202a, the bottom wall 202b, and the side walls 202c and 202d. The edges of the top wall 202a, bottom wall 202b, and side walls 202c and 202d that are opposite the rear wall 202e define an enclosure entrance 204 that is located opposite the base 202 from the rear wall 202e. The rack entrance 204 provides access to a enclosure housing 206 that is defined between the top wall 202a, the bottom wall 202b, the side walls 202c and 202d, and the rear wall 202e. A plurality of slot walls 208 are located the enclosure housing 206 in a spaced apart orientation from each other and extend between the side walls 202c and 202d and the rear wall 202e to define a plurality of a slots 206a. In the illustrated embodiment, a backplane 210 is positioned adjacent the rear wall 202e, extends between the top wall 202a and the bottom wall 202b, and includes IHS connections 210a located adjacent each of the slots 206a. In an embodiment, the backplane 210 may include circuit boards, processing systems, memory systems, traces and/or other connections between the backplane components, and/or a variety of other backplane features known in the art that have not been illustrated for clarity. While a backplane 210 is illustrated and described as providing for the connection of and communication between IHSs, discussed below, any manner for connecting and communicating between IHSs in the IHS/chassis enclosure 200 is envisioned as falling within the scope of the present disclosure. The IHS/chassis enclosure 200 may also include features for coupling, moving, securing, and/or otherwise allowing IHSs to be positioned in any of the plurality of slots 206a in the IHS/chassis enclosure 200.

Figure 3A:
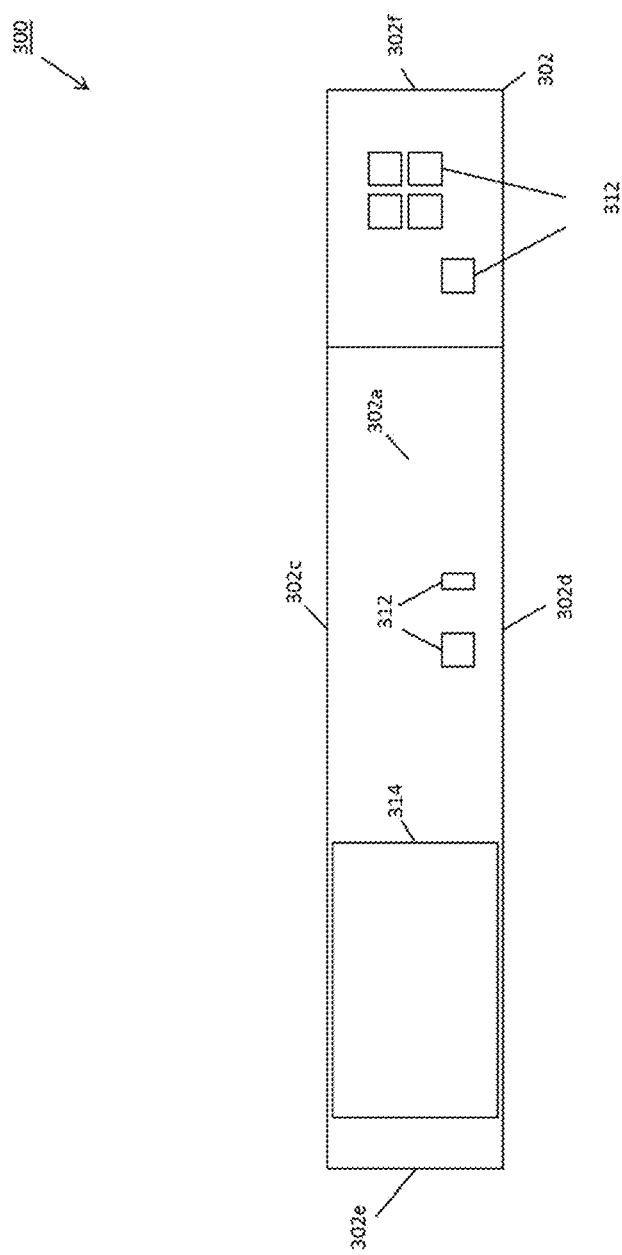
FIG. 3a is a front view illustrating an embodiment of an IHS including a display device.
Figure 3B:
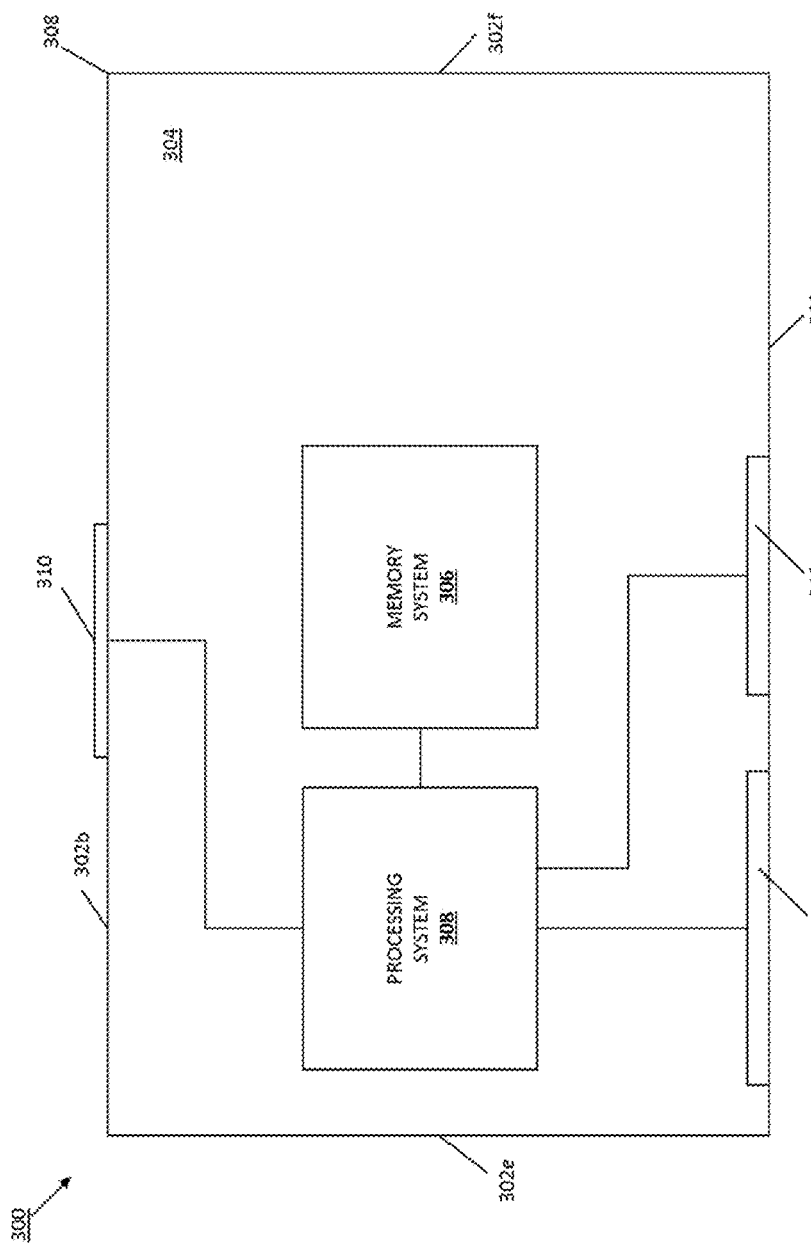

Referring now to FIGS. 3a and 3b, an embodiment of an IHS 300 is illustrated. In an embodiment, the IHS 300 may be the IHS 100, discussed above with reference to FIG. 1, and/or may include some or all of the components of the IHS 100. The IHS 300 includes an IHS chassis 302 having a front surface 302a, a rear surface 302b located opposite the IHS chassis 302 from the front surface 302a, a top surface 302c extending between the front surface 302a and the rear surface 302b, a bottom surface 302d located opposite the IHS chassis 302 from the top surface 302c and extending between the front surface 302a and the rear surface 302b, and a pair of opposing side surfaces 302e and 302f located opposite the IHS chassis 302 from each other and extending between the front surface 302a, the rear surface 302b, the top surface 302c, and the bottom surface 302d. In an embodiment, any of the front surface 302a, the rear surface 302b, the top surface 302c, the bottom surface 302d, and the side surfaces 302e and 302f may include features for coupling, moving, securing, and/or otherwise allowing then IHS 300 to be positioned in any of the plurality of slots 206a in the IHS/chassis enclosure 200. While the IHS chassis 302 is illustrated and described as a generally rectangular box-shaped chassis for clarity of description and illustration, one of skill in the art will in possession of the present disclosure will recognize that that IHS chassis 302 may be any structure that is configured to support the components of the IHS 300. For example, the IHS chassis 302 may include a Printed Working Assembly (PWA) or any other chassis structure known in the that supports a display device and that is configured to couple to a chassis enclosure adjacent other chassis structures, similarly as is described and illustrated below.

An IHS housing 304 is defined by the IHS chassis 302 between the front surface 302a, the rear surface 302b, the top surface 302c, the bottom surface 302d, and the side surfaces 302e and 302f. A memory system 306, which may be the system memory 114 discussed above with reference to FIG. 1, is located in the IHS housing 304. A processing system 308, which may be the processor 102 discussed above with reference to FIG. 1, is located in the IHS housing 304 and coupled to the memory system 306. In an embodiment, the memory system 306 includes instructions that, when executed by the processing system 308, cause the processing system 308 to provide display coordination engines and screen agents that are configured to perform the functions of the display coordination engines and screen agents discussed in further detail below.

A backplane connector 310 is located on the rear surface 302b of the IHS chassis 302 and is coupled to the processing system 308. A plurality of IHS features 312 are located on the front surface 302a of the IHS chassis 302 and are coupled to the processing system 308. The IHS features 312 may include connectors, status indicators (e.g., light emitting devices (LEDs)), switches, buttons, ports (e.g., Universal Serial Bus (USB) ports, Ethernet ports, etc.) and/or a variety of other IHS features known in the art. One of skill in the art will recognize that IHS features may be located anywhere on the IHS chassis 302 and coupled to the processing system 308 while remaining within the scope of the present disclosure. A display device 314 is located on the front surface 302a of the IHS chassis 302 and is coupled to the processing system 308. In the illustrated embodiment, the display device 314 is located on the front surface 302a of the IHS chassis 302, adjacent the side surface 302e, and extends substantially between the top surface 302c and the bottom surface 302d. However, display devices may be of any size and be located anywhere on the IHS chassis 302, and multiple display devices may be located on a surface of the IHS chassis 302 (e.g., the front surface 302a) and coordinated using the teachings of the present disclosure, discussed below. Furthermore, one of skill in the art in possession of the present disclosure will recognize the display device 314 may be sized to extend up to or beyond the edges of the front surface 302a of the IHS chassis 302 such that they may be positioned immediately adjacent display devices on other IHSs chassis, discussed in further detail below. In the embodiments discussed below, the display device 314 is a touch input display device that allows a user to provide inputs to the processing system 308 by touching a surface of the display device 314. However, in other embodiments, the display device 314 may not provide such touch input functionality. In some embodiments, the display device 314 may be moveable or otherwise configured to have its position adjusted relative to the IHS chassis 302 (e.g., the display device 314 may be moveable relative to the front surface 302a of the base 302).

In the embodiments discussed below, the IHS 300 is a Control Module IHS or Supervisor Module IHS that is configured to be coupled to other Control Module IHSs or Supervisor Module IHSs and switch IHSs in the IHS/chassis enclosure 200. However, the IHS 300 may be any of a wide variety of IHSs or other devices known in the art that include display devices on an outer surface of their chassis including, but not limited to, server IHSs (e.g., blade servers), storage IHSs, other networking IHSs, etc. Furthermore, in the embodiments illustrated and described below, two identical IHSs (referred to as a "first" or "master" IHS and a "second" or "slave" IHS) that are substantially similar to the IHS 300 are provided positioned adjacent each other such that their display devices are located adjacent each other during the methods of the present disclosure. However, the IHSs including the display devices discussed below may be different from each other (e.g., different types of IHSs, different models of IHSs, IHSs from different manufacturers, and/or other IHS differences known in the art) and may number more than two (e.g., such that there are three or more display devices coordinated using the teachings of the present disclosure) while remaining within the scope of the present disclosure.

Referring now to FIG. 4, an embodiment of an IHS 400 is illustrated. In an embodiment, the IHS 400 may be the IHS 100, discussed above with reference to FIG. 1, and/or may include some or all of the components of the IHS 100. The IHS 400 includes an IHS chassis 402 having a front surface 402a, a rear surface (not visible in FIG. 4) located opposite the IHS chassis 402 from the front surface 402a, a top surface 402b extending between the front surface 402a and the rear surface, a bottom surface 402c located opposite the IHS chassis 402 from the top surface 402b and extending between the front surface 402a and the rear surface, and a pair of opposing side surfaces 402d and 402e located opposite the IHS chassis 402 from each other and extending between the front surface 402a, the rear surface, the top surface 402b, and the bottom surface 402c. In an embodiment, any of the front surface 402a, the rear surface, the top surface 402b, the bottom surface 402c, and the side surfaces 402d and 402e may include features for coupling, moving, securing, and/or otherwise allowing then IHS 400 to be positioned in any of the plurality of slots 206a in the IHS/chassis enclosure 200. A plurality of ports 404 are located on the front surface 402a of the IHS chassis 402, and a backplane connector (not visible in FIG. 4) that is substantially similar to the backplane connector 310 of FIG. 3 may be located on the rear surface of the IHS chassis 400. One of skill in the will recognize that the IHS 400 is a switch IHS. However, in the methods discussed below, the switch IHS 400 may be omitted, or may be any other IHS or device that does not include a display device that may be coordinated with other display devices according to the teachings of the present disclosure.

Figure 5A:
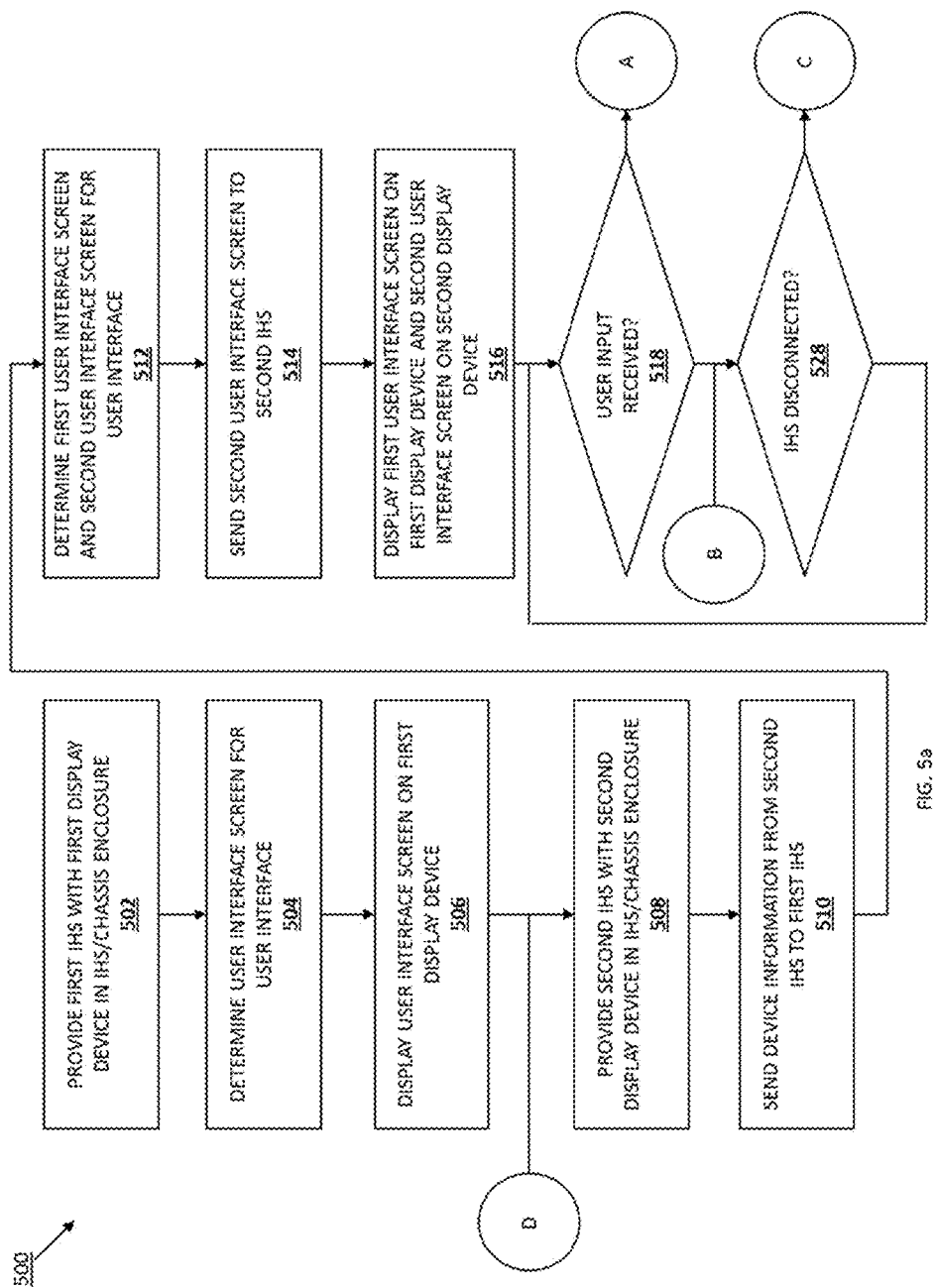
FIG. 5a is a flow chart illustrating an embodiment of a portion of a method for multi-chassis coordinated display.

Referring now to FIGS. 5a, 5b, and 5c, an embodiment of a method 500 for a multi-chassis coordinated display is illustrated. In the method 500 discussed below, the multi-chassis coordinated display system is illustrated and described with two IHSs—a first/master IHS and a second/slave IHS. However, one of skill in the art in possession of the present disclosure will recognize that more IHSs may be provided during the method 500, and operations of the first/master IHS with the second/slave IHS discussed below may be extended to any number of slave IHSs while remaining within the scope of the present disclosure.

Figure 6D:
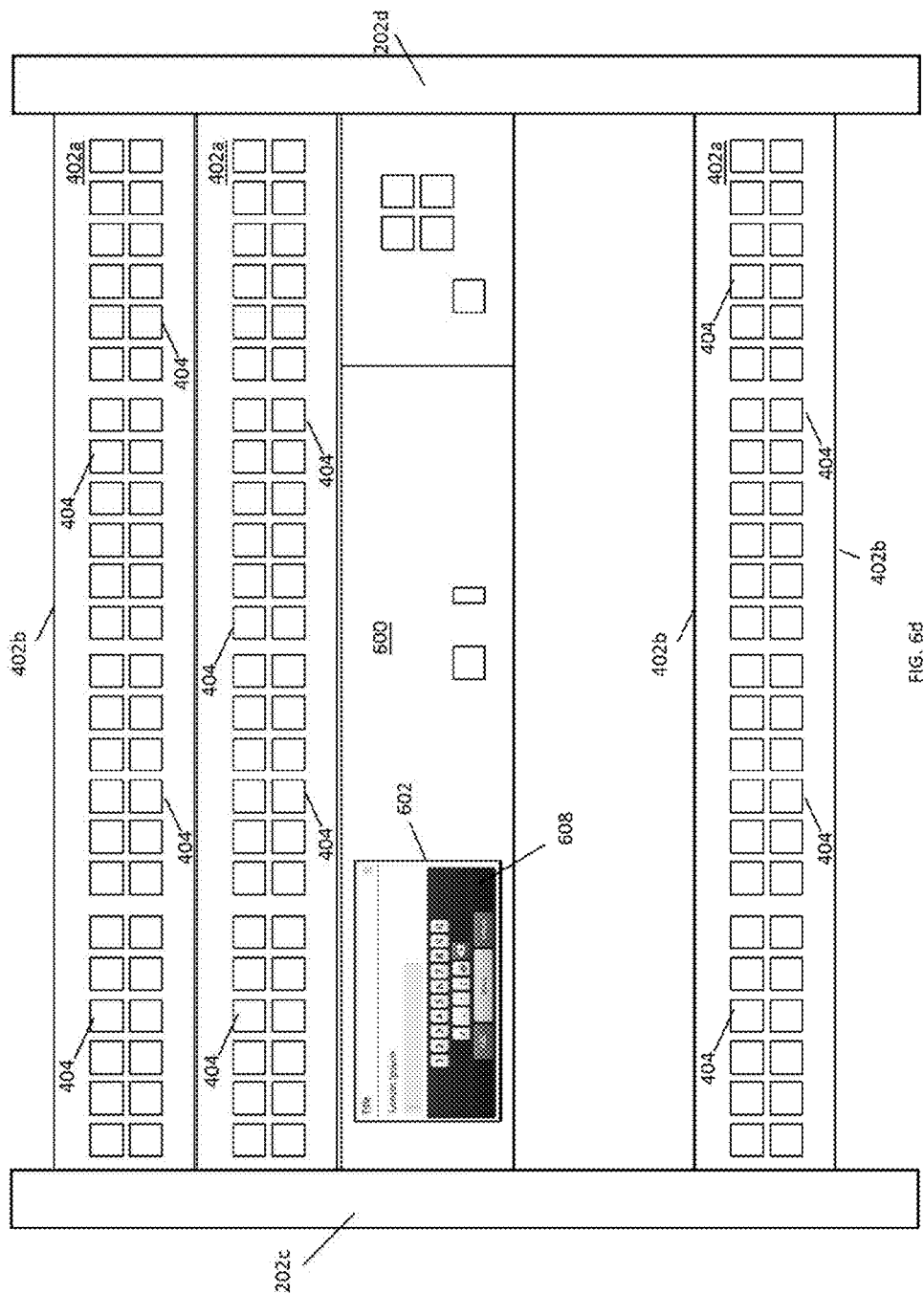
FIG. 6d is a front view illustrating an embodiment of a display device on the master IHS of FIG. 6a displaying a third user interface.

Referring to FIGS. 5a, 6a, 6b, 6c, and 6d, the method 500 begins at block 502 where a first IHS with a first display device is provided in an IHS/chassis enclosure. FIG. 6a illustrates the IHS/chassis enclosure 200 of FIGS. 2a and 2b including a plurality of the IHSs 400 of FIG. 4 positioned in the slots 206a such that the backplane connectors on the rear surfaces of the IHS chassis 400 are coupled to respective IHS connections 210a on the backplane 210. At block 502, a first IHS 600 including a first display device 602 is positioned in a slot 206a on the IHS/chassis enclosure 200. In the illustrated embodiment, the first IHS 600 is substantially similar to the IHS 300 discussed above with reference to FIGS. 3a and 3b, and components of the IHS 300 are referenced in parenthesis below when referring to similar components in the first IHS 600. The positioning of the first IHS 600 in the slot 206a causes the backplane connector (310) on the rear surface (302b) of the IHS chassis (300) to be coupled to a respective IHS connection 210a on the backplane 210. Connection of the first IHS 600 to the backplane 210 communicatively connects the first IHS 600 to the IHSs 400. As discussed above, the IHSs 400 may be switch IHSs and the first IHS 600 may be a Control Module IHS or Supervisor Module IHS. However, the first IHS 600 may be any other IHS having a display device, and may not need to be coupled to other IHSs like the IHSs 400.

The method 500 then proceeds to block 504 where a user interface screen is determined for a user interface. In an embodiment, the memory system (306) in the first IHS 600 includes instructions that, when executed by the processing system (308) in the first IHS 600, cause processing system (308) to provide a display coordination engine that is configured (e.g., on startup) to determine whether any other IHSs with display devices are coupled to the first IHS 600. Thus, at block 504, the display coordination engine in the first IHS 600 may determine that there are no other IHSs with display devices that are coupled to the IHS 600 and, in response, determine that the first IHS 600 is a master IHS 600 (further reference to the first IHS 600 will be to a "master IHS 600" as long as the first IHS 600 is operating as the master IHS 600). Furthermore, the display coordination engine may then provide a master screen agent on the master IHS 600 that is configured to perform the operations of the master screen agents discussed below. The provision of the master screen agent on the master IHS 700 may be performed according to a master screen agent election process, discussed in further detail below. As the master IHS 700 is the only IHS with a display device in the IHS/chassis enclosure 200 in FIG. 6a, the IHS 700 may be elected the master IHS 700 and provided the master screen agent. At block 504, the master screen agent may determine that a user interface is available for display on the first display device 602 of the master IHS 600 and, in response, determine a user interface screen for that user interface. The method 500 then proceeds to block 506 where the user interface screen is displayed on the first display device.

Referring now to FIGS. 6b, 6c, and 6d, different embodiments of user interface screens determined for different user interfaces and displayed on the first display device 602 of the master IHS 600 are illustrated and described. Referring first to FIG. 6b, the master screen agent in the master IHS 600 has determined that a user interface is available that includes a plurality of information text. In response, the master screen agent has determined a user interface screen 604 for that user interface that displays the information text only on the first display device 604, and may allow a user to "scroll" through the information text to access information text that is not currently displayed. For example, FIG. 6b illustrates the user interface screen 604 displayed on the display device 602, and a user may provide a touch input such as, for example, a "swipe", to scroll through the information text to access information text that is not currently displayed on the display device 602 (e.g., above, below, or on either side of the information text that is displayed in FIG. 6b). As such, in response to any input or instruction from a user, the master screen agent may determine new user interface screens to display the user interface only on the first display device 602 (e.g., a plurality of different user interface screens that are displayed to scroll through the information text provided on the user interface).

Referring next to FIG. 6c, the master screen agent in the master IHS 600 has determined that a user interface is available that includes a control dashboard. In response, the master screen agent has determined a user interface screen 606 for that user interface that displays the control dashboard only on the first display device 602, and allows a user to select devices (e.g., IHSs 400 coupled to the IHS 600), view device status, provide instructions to devices, and/or perform a variety of other control dashboard functionality known in the art. For example, FIG. 6c illustrates the user interface screen 606 displayed on the first display device 602, and a user may provide a touch input such as, for example, a "tap", to select a device, view information about that device, and provide instructions to that device. As such, in response to any input or instruction from a user, the master screen agent may determine new user interface screens to display the user interface only on the first display device 602 (e.g., a plurality of user interface screens that are displayed as the user to selects devices, views device status, provides instructions to devices, etc.).

Referring next to FIG. 6d, the master screen agent in the master IHS 600 has determined that a user interface is available that includes an authentication input. In response, the master screen agent has determined a user interface screen 608 for that user interface that displays the authentication input only on the first display device 602, and allows a user to provide authentication information. For example, FIG. 6d illustrates the user interface screen 608 displayed on the display device 602, and a user may provide authentication information using a keypad and have that authentication information displayed in an input box. As such, in response to any input or instruction from a user, the master screen agent may determine new user interface screens to display the user interface only on the first display device 602 (e.g., a plurality of user interface screens that are displayed as the user enters different authentication information, and that inform the user if the authentication information they have entered is valid or not, etc.). While a few examples have been provided, one of skill in the art in possession of the present disclosure will recognize that the master screen agent may determine user interface screens for any type of user interface (e.g., "render" that user interface) for display on only the first display screen 602 of the master IHS 600 when there are no other IHSs ("slave" IHSs, discussed below) coupled to the master IHS 600. Furthermore, the screens displayed on the first display device 602 need not be user interface screen, but may be any other display screen known in the art.

The method 500 then proceeds to block 508 where a second IHS including a second display device is provided in the IHS/chassis enclosure. While only one second IHS having a display device is illustrated and discussed below, any number of IHSs with display devices may be provided in the system (and operate as "slave IHSs", discussed below) while remaining within the scope of the present disclosure. FIG. 7a illustrates the IHS/chassis enclosure 200 of FIGS. 2a and 2b including the plurality of IHSs 400 and the master IHS 600 including the first display device 602 positioned in the slots 206a on the IHS/chassis enclosure 200, as discussed above. At block 508, a second IHS 700 including a second display device 702 is positioned in a slot 206a on the IHS/chassis enclosure 200 that is adjacent the master IHS 600, as illustrated in FIG. 7a. In the illustrated embodiment, the second IHS 600 is substantially similar to the IHS 300 discussed above with reference to FIGS. 3a and 3b, and components of the IHS 300 are referenced in parenthesis below when referring to similar components in the second IHS 700. The positioning of the second IHS 700 in the slot 206a causes the backplane connector (310) on the rear surface (302b) of the IHS chassis (300) to be coupled to a respective IHS connection 210a on the backplane 210. Connection of the second IHS 700 to the backplane 210 communicatively connects the second IHS 700 to the master IHS 600 and the IHSs 400. As discussed above, the IHSs 400 may be switch IHSs and the master IHS 600 and second IHS 700 may be Control Module IHSs or Supervisor Module IHSs. However, the second IHS 700 may be any other IHS having a display device, and may not need to be coupled to other IHSs like the IHSs 400.

In the illustrated embodiment, the positioning of the second IHS 700 in the IHS/chassis enclosure 200 adjacent the master IHS 600 causes the second display device 702 on the second IHS 700 to be positioned immediately adjacent and below the first display device 602 on the master IHS 600. However, in other embodiments, the relative positioning of the master IHS 600 and the second IHS 700 may provide the first display device 602 and the second display device 702 positioned side-by-side, offset from each other, and/or in a variety of other positions relative to each other.

As discussed above, the first display device 602 and the second display device 702 may be dimensioned such that when the master IHS 600 and the second IHS 700 are positioned adjacent each other, the first display device 602 and the second display device 702 are immediately adjacent and engaging each other along an edge to provide a near continuous display surface using the first display device 602 and the second display device 702. However, in other embodiments, the positioning of the master IHS 600 and the second IHS 700 in the IHS/chassis enclosure 200 may provide a break between the display surfaces provided by the first display device 602 and the second display device 702, as illustrated. As discussed above, the display devices on the master IHS 600 and the second IHS 700 may be configured to have their positions adjustable such that the first display device 602 and the second display device 702 may be repositioned such that they are immediately adjacent each other (e.g., such that the display device surfaces are positioned edge-to-edge in order to provide continuity across the first display device 602 and the second display device 702 and the feel of a single display device surface). Furthermore, while the master IHS 600 and the second IHS 700 are illustrated as substantially identical, the multi-chassis coordinated display system may be provided using display devices on different type IHSs, different model IHSs, different generation IHSs, and/or a variety of other different IHSs known in the art.

The method 500 then proceeds to block 510 where device information is sent from the second IHS to the first IHS. In an embodiment, the memory system (306) in the second IHS 700 includes instructions that, when executed by the processing system (308) in the second IHS 700, cause processing system (308) to provide a display coordination engine that is configured (e.g., on startup) to determine whether any other IHSs with display devices are coupled to the second IHS 700. Thus, at block 510, the display coordination engine in the second IHS 700 may determine that it is coupled to the master IHS 600 with the first display device 602 and, in response, determine that the second IHS 700 is a slave IHS 700 (further reference to the second IHS 700 will be to a "slave IHS 700" as long as the second IHS 700 is operating as the slave IHS 700). Furthermore, the display coordination engine in the second IHS 700 may then provide a screen sub-agent on the slave IHS 700 that is configured to perform the operations of the screen sub-agents discussed below. Any screen sub-agent provided in a slave IHS that is coupled to the master IHS 700 may register with the master screen agent in the master IHS 600 prior to block 510.

Figure 7B:
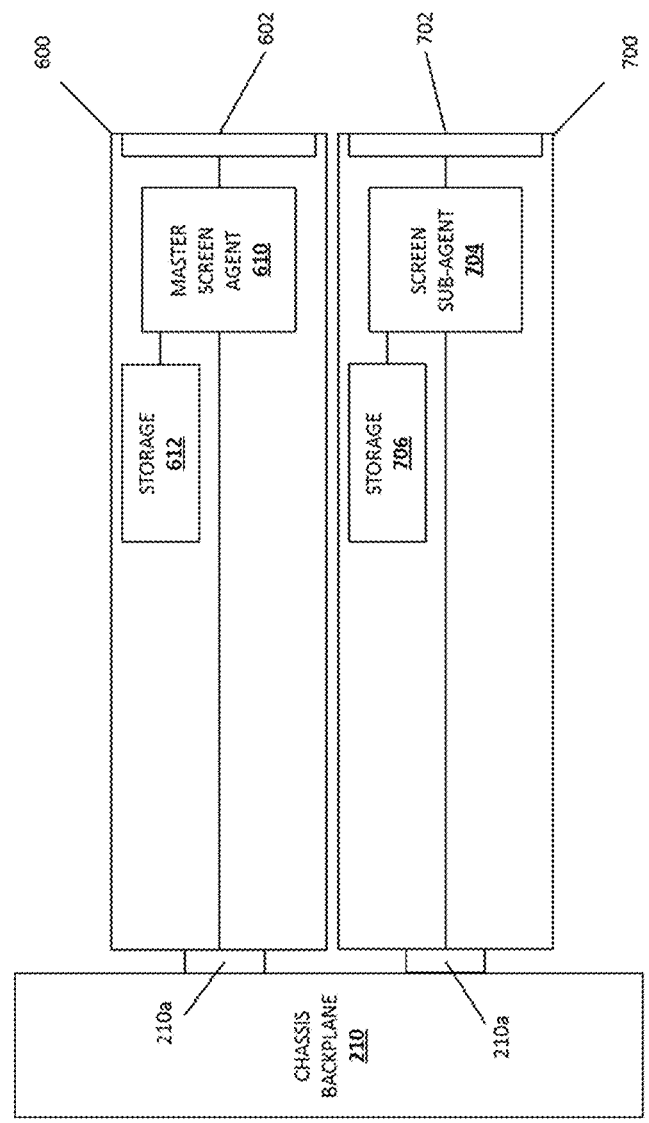

FIG. 7b illustrates the master IHS 600 including the first display screen 602 and the slave IHS 700 including the second display screen 702 both coupled to the backplane 210. As can be seen, the coupling of the master IHS 600 and the slave IHS 700 to the backplane 210 communicatively couples the master screen agent 610 in the master IHS 600 to the screen sub-agent 704 in the slave IHS 700 (e.g., via an IP/Ethernet connection). As illustrated in FIG. 7b, the master screen agent 610 is coupled to a storage 612, and the screen sub-agent 704 is coupled to a storage 706. At block 510, the screen subagent 704 may retrieve device information from the storage 706 and send that device information to the master screen agent 610 such that the master screen agent 610 may store that device information in the storage 612. In an embodiment, the device information sent from the slave IHS 700 to the master IHS 600 may include any information about the slave IHS 700 that can be used by the master IHS 600 to provide for the coordinated display of user interfaces discussed below. For example, the device information may include a type, model, make, and/or manufacturer of the slave IHS 700. The device information may include dimensions of the IHS chassis (302) of the slave IHS 700, features provided on the slave IHS 700, a type of the second display device 702, and/or the positioning and/or dimensions of the second display device 702. The device information may include location in the IHS rack 200 (e.g., an identity of the slot 206a) that the slave IHS 700 has detected it is positioned in. The device information may include functionality provided by the slave IHS 700. The device information may include display device configuration information such as resolution, brightness, contrast, display device orientation, viewing angle, mechanical range of motion, input buttons, LEDs, etc. While a few examples have been provided, one of skill in the art in possession of the present disclosure will recognize that a wide variety of device information about the slave IHS 700 may be used to provide for the coordinated display of user interfaces discussed below, and thus will fall within the scope of the present disclosure. Furthermore, any number of slave IHSs including display devices and coupled to the IHS/chassis enclosure 200 may provide device information to the master IHS 700 at block 510.

The method 500 then proceeds to block 512 where a first user interface screen and a second user interface screen are determined for a user interface. In an embodiment, the master screen agent 610 is configured to receive the device information from the slave IHS 700 and determine that the slave IHS 700 and the second display device 702 are configured to allow for the coordinated display of user interfaces. Using the device information received from the slave IHS(s), as well as device information for the master IHS 600, the master IHS 600 may determine a number of display devices that are available for coordinated display, the relative positioning of those display devices, configuration details (e.g., resolution, brightness, contrast, display device orientation, viewing angle, mechanical range of motion, input buttons, LEDs, etc.), and/or a variety of other display device details known in the art. At block 512, the master screen agent 610 may then determine that a user interface is available for display on both the first display device 602 of the master IHS 600 and the second display device 702 of the slave IHS 700 and, in response, determine a first user interface screen and a second user interface screen for that user interface. The method 500 then proceeds to block 514 where the second user interface screen is sent to the slave IHS 700, and block 516 where the first user interface screen is displayed on the first display device and the second user interface screen is displayed on the second display device. As can be seen in the examples illustrated and provided below, Gestalt design principles may be used in the user interface screens to elicit the perception that objects that look similar are part of a group or pattern by using, for example, simple border design treatments and logical groupings of content across first user interface screens and second user interfaces screens that are used to provide a user interface.

Referring now to FIGS. 7c, 7d, and 7e, different embodiments of user interface screens determined for different user interfaces and displayed on the first display device 602 of the master IHS 600 and the second display device 702 of the slave IHS 700 are illustrated and described. Referring first to FIG. 7c, and with reference back to the user interface screen 604 discussed above with reference to FIG. 6b, the master screen agent 610 in the master IHS 600 has determined that a user interface is available that includes a plurality of information text. For example, the master screen agent 610 may be displaying the user interface screen 604 of FIG. 6*b* for a user interface prior to the provision of the slave IHS 700 in the IHS rack 200, and at block 512 may then determine a first user interface screen and a second user interface screen for that same user interface. Referring to FIG. 7*c*, the master screen agent 610 has determined a first user interface screen 614 and a second user interface screen 708 for that user interface, provided the second user interface screen 708 to the screen sub-agent 704, and displayed the first user interface screen 614 on the first display device 602 while the screen sub-agent 704 displays the second user interface screen 708 on the second display device 702.

In an embodiment, at block 512 the master screen agent 610 may use the device information received from the slave IHS 600 at block 510, as well as device information about the master IHS 700, to determine how to provide the user interface on both the first display device 602 and the second display device 702. For example, a display devices relative position on the IHS, the display devices relative position to each other, the dimensions of the display devices, and/or a variety of other display device characteristics known in the art may be used to determine how to provide the user interface on a first user interface screen and a second user interface screen. In response to determining the first user interface screen 614 and the second user interface screen 708, the master screen agent 610 creates a first screen task that includes instructions (e.g., configuration script) for displaying the first user interface screen 614 and a second screen task that includes instructions (e.g., configuration script) for displaying the second user interface screen 708. At block 514, the master screen agent 610 provides the second screen task to the screen sub-agent 704 in the slave IHS 700. At block 516, the master screen agent 610 executes the first screen task to display the first user interface screen 614 on the first display device 602, and the screen sub-agent 704 executes the second screen task to display the second user interface screen 708 on the second display device 702, as illustrated in FIG. 7*c*. In an embodiment, the master screen agent 610 may share any screen tasks that are created with each slave IHS in the multi-chassis display coordination system.

The display of the first user interface screen 614 on the first display device 602 and the display of the second user interface screen 708 on the second display device 702 provides for the coordinated display of the user interface on the first display device 602 and the second display device 702. For example, referring also to the user interface screen 604 illustrated in FIG. 6*b*, the coordinated display of the user interface using the first user interface screen 614 and the second user interface screen 708 on the first display device 602 and the second display device 702 provides the user interface that includes a plurality of information text across the first display device 602 and the second display device 702. As such, the user interface may be displayed differently using the first display device 602 and the second display device 702 than it was using just the first display device 602. For example, information text that may not have been displayed on the first display device 602 using the user interface screen 604, illustrated in FIG. 6*b*, is displayed (or is displayed differently) using the first user interface screen 614 and the second user interface screen 708 on the first display device 602 and the second display device 702. In the illustrated example, the functionality of the user interface has been expanded using the second display device 702 to provide additional information text (and an input button) that were not visible when that user interface was only displayed on the first display device 602.

Referring next to FIG. 7*d*, and with reference back to the user interface screen 606 discussed above with reference to FIG. 6*c*, the master screen agent 610 in the master IHS 600 has determined that a user interface is available that includes a control dashboard. For example, the master screen agent 610 may be have been displaying the user interface screen 606 of FIG. 6*c* for the user interface prior to the provision of the slave IHS 700 in the IHS/chassis enclosure 200, and at block 512 may then determine a first user interface screen and a second user interface screen for that same user interface. Referring to FIG. 7*d*, the master screen agent 610 has determined a first user interface screen 616 and a second user interface screen 710 for that user interface, provided the second user interface screen 710 to the screen sub-agent 704, and displayed the first user interface screen 616 on the first display device 602 while the screen sub-agent 704 displays the second user interface screen 710 on the second display device 702.

In an embodiment, at block 512 the master screen agent 610 may use the device information received from the slave IHS 600 at block 510, as well as device information about the master IHS 700, to determine how to provide the user interface on both the first display device 602 and the second display device 702. For example, a display devices relative position on the IHS, the display devices relative position to each other, the dimensions of the display devices, and/or a variety of other display device characteristics known in the art may be used to determine how to provide the user interface on a first user interface screen and a second user interface screen. In response to determining the first user interface screen 616 and the second user interface screen 710, the master screen agent 610 creates a first screen task that includes instructions (e.g., configuration script) for displaying the first user interface screen 616 and a second screen task that includes instructions (e.g., configuration script) for displaying the second user interface screen 710. At block 514, the master screen agent 610 provides the second screen task to the screen sub-agent 704 in the slave IHS 700. At block 516, the master screen agent 610 executes the first screen task to display the first user interface screen 616 on the first display device 602, and the screen sub-agent 704 executes the second screen task to display the second user interface screen 710 on the second display device 702, as illustrated in FIG. 7*d*. In an embodiment, the master screen agent 610 may share any screen tasks that are created with each slave IHS in the multi-chassis display coordination system.

The display the first user interface screen 616 on the first display device 602 and the display of the second user interface screen 710 on the second display device 702 provides for the coordinated display of the user interface on the first display device 602 and the second display device 702. For example, referring also to the user interface screen 616 illustrated in FIG. 6*c*, the coordinated display of the user interface using the first user interface screen 616 and the second user interface screen 710 on the first display device 602 and the second display device 702 provide the user interface that includes the control dashboard across the first display device 602 and the second display device 702. As such, the user interface may be displayed differently using the first display device 602 and the second display device 702 than it was using just the first display device 602. For example, device information that may not have been displayed on the first display device 602 using the user interface screen 606, illustrated in FIG. 6*c*, is displayed (or is displayed differently) using the first user interface screen 616 and the second user interface screen 710 on the first display device 602 and the second display device 702. In the illustrated example, the functionality of the user interface has been expanded using the second display device 702 to provide additional device information (and an input button) that was not visible when that user interface was only displayed on the first display device 602.

Referring next to FIG. 7e, and with reference back to the user interface screen 608 discussed above with reference to FIG. 6d, the master screen agent 610 in the master IHS 600 has determined that a user interface is available that includes an authentication input. For example, the master screen agent 610 may be have been displaying the user interface screen 608 of FIG. 6d for the user interface prior to the provision of the slave IHS 700 in the IHS rack 200, and at block 512 may then determine a first user interface screen and a second user interface screen for that same user interface. Referring to FIG. 7e, the master screen agent 610 has determined a first user interface screen 618 and a second user interface screen 712 for that user interface, provided the second user interface screen 712 to the screen sub-agent 704, and displayed the first user interface screen 618 on the first display device 602 while the screen sub-agent 704 displays the second user interface screen 712 on the second display device 702.

In an embodiment, at block 512 the master screen agent 610 may use the device information received from the slave IHS 600 at block 510, as well as device information about the master IHS 700, to determine how to provide the user interface on both the first display device 602 and the second display device 702. For example, a display devices relative position on the IHS, the display devices relative position to each other, the dimensions of the display devices, and/or a variety of other display device characteristics known in the art may be used to determine how to provide the user interface on a first user interface screen and a second user interface screen. In response to determining the first user interface screen 618 and the second user interface screen 712, the master screen agent 610 creates a first screen task that includes instructions (e.g., configuration script) for displaying the first user interface screen 618 and a second screen task that includes instructions (e.g., configuration script) for displaying the second user interface screen 712. At block 514, the master screen agent 610 provides the second screen task to the screen sub-agent 704 in the slave IHS 700. At block 516, the master screen agent 610 executes the first screen task to display the first user interface screen 618 on the first display device 602, and the screen sub-agent 704 executes the second screen task to display the second user interface screen 712 on the second display device 702, as illustrated in FIG. 73. In an embodiment, the master screen agent 610 may share any screen tasks that are created with each slave IHS in the multi-chassis display coordination system. While several specific examples have been provided above, one of skill in the art in possession of the present disclosure will recognize that determination of a first user interface screen and a second user interface screen for a user interface, and the provision of those user interface screens for display on different display devices controlled by different processing systems, may be accomplished in a variety of manners while remaining within the scope of the present disclosure.

The display the first user interface screen 618 on the first display device 602 and the display of the second user interface screen 712 on the second display device 702 provides for the coordinated display of the user interface on the first display device 602 and the second display device 702. For example, referring also to the user interface screen 616 illustrated in FIG. 6c, the coordinated display of the user interface using the first user interface screen 618 and the second user interface screen 712 on the first display device 602 and the second display device 702 provide the user interface that includes authentication input across the first display device 602 and the second display device 702. As such, the user interface may be displayed differently using the first display device 602 and the second display device 702 than it was using just the first display device 602. For example, device information that may not have been displayed on the first display device 602 using the user interface screen 606, illustrated in FIG. 6c, is displayed (or is displayed differently) using the first user interface screen 616 and the second user interface screen 712 on the first display device 602 and the second display device 702. In the illustrated example, the functionality of the user interface has been expanded using the second display device 702 to provide an additional authentication input that was not visible when that user interface was only displayed on the first display device 602.

Figure 8B:
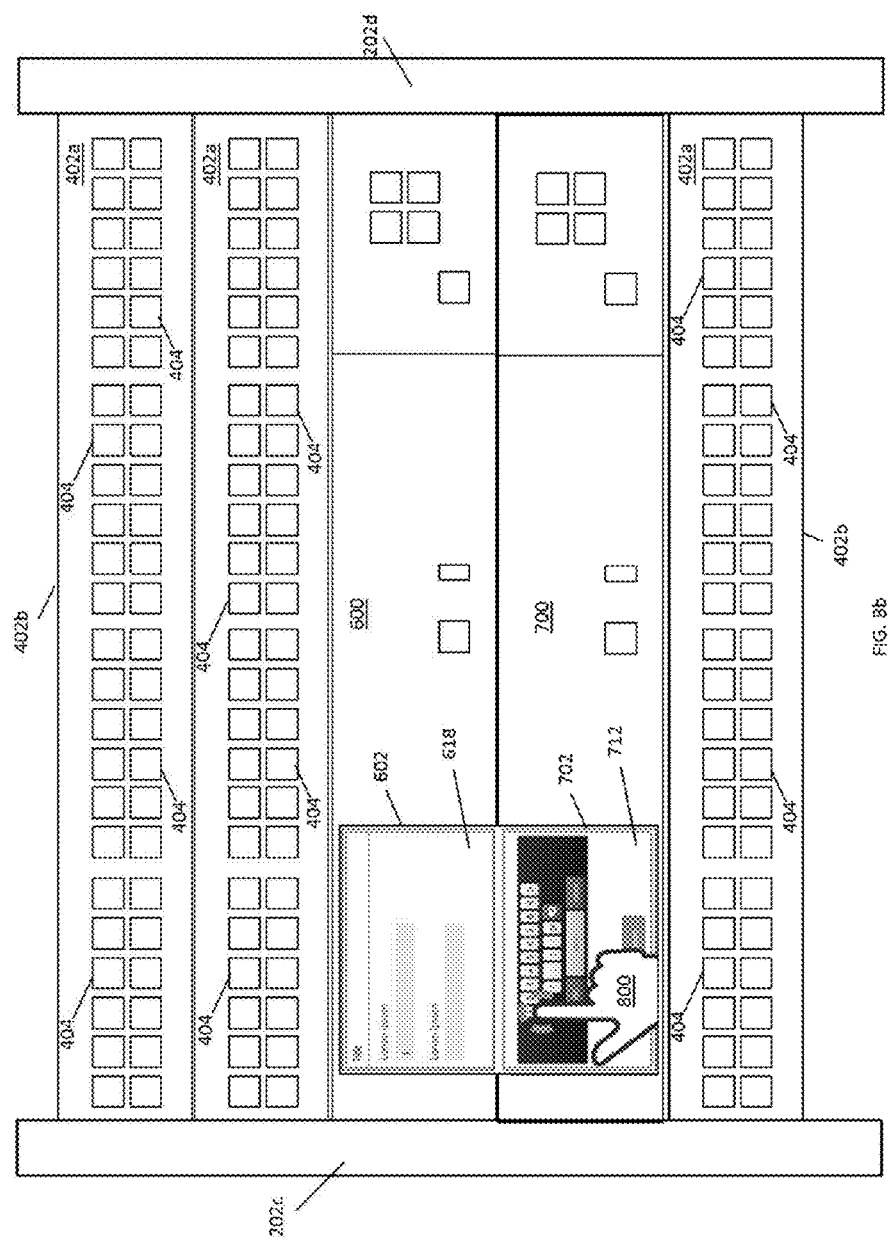
FIG. 8b is a front view illustrating an embodiment of a user input being provided on at least one of the display devices on the master IHS and slave IHS of FIG. 7e displaying the third user interface.

The method 500 then proceeds to decision block 518 where it is determined whether a user input is received. In an embodiment, either or both of the master screen agent 610 in the master IHS 600 and the screen sub-agent 704 in the slave IHS 700 may operate at decision block 518 to monitor the display devices 602 and 702, respectively, to determine whether a user input has been received. Referring first to FIGS. 7c and 8a, a user 800 (illustrated by a schematic user hand) may provide a user input to the user interface displayed using either or both of the first user interface screen 614 on the first display device 602 and the second user interface screen 708 on the second display device 702 by, for example, swiping a finger across the first display device 602 and/or the second display device 702 to indicate that the user would like to, for example, view information text that is not visible on either of the first display device 602 and/or the second display device 702. Referring next to FIGS. 7e and 8b, the user 800 (illustrated by a schematic user hand) may provide a user input to the user interface displayed on either or both of the first user interface screen 614 on the first display device 602 and the second user interface screen 708 on the second display device 702 by, for example, tapping a finger on the second display device 702 to indicate that the user would like to, for example, enter authentication information that should then be displayed on the first display device 602. While a few examples of user inputs have been provided, one of skill in the art in possession of the present disclosure will recognize that any of a variety of user inputs known in the art will fall within the scope of the present disclosure. If no user input is received at decision block 518, the method 500 proceeds to decision block 528, discussed in further detail below. If a user input is received at decision block 518, the method 500 proceeds to block 520.

Referring now to FIG. 5b, at block 520, the user input received at decision block 518 is stored and shared with other IHSs. For example, if the user input was provided on the first display device 602 and received by the master screen agent 610, that user input is stored by the master screen agent 610 in the storage 612 and shared with the screen sub-agent 704. Similarly, if the user input was provided on the second display device 702 and received by the screen sub-agent 704, that user input is stored by the screen sub-agent 704 in the storage 706 and shared with the master screen agent 610. The storing and sharing of user inputs may provide that those user inputs are not lost or otherwise required to be provided again in the event of the disconnection of the master IHS 600 and the slave IHS 700, discussed in further detail below. In an embodiment, in place of or in addition to user inputs, the master screen agent 610 may record and store a transaction journal history of users inputs, screen settings, user preferences, and/or other details of the user interaction and navigation using the first display device 602 and the second display device 702, and may replicate and/or share that transaction journal history with each screen sub-agent in the multi-chassis display coordination system.

The method 500 then proceeds to block 522 where a third user interface screen and a fourth user interface screen are determined for the user interface. In an embodiment, the master slave agent 610 is configured to receive the user input (e.g., through the first display device 602 and/or from the screen sub-agent 704) to the user interface as displayed using the first user interface screen on the first display device 602 and the second user interface screen on the second display device 702, and use that user input determine third user interface screen(s) and a fourth user interface screen(s) for that user interface that will display the response of the user interface to that user input. As such, a third user interface screen (or a plurality of third user interface screens) are determined using the user input to replace the first user interface screen on the first display device 602, and a fourth user interface screen (or a plurality of fourth user interface screens) are determined using the user input to replace the second user interface screen on the second display device 702. In other words, in some embodiments of the method 500 discussed below, the terms "third" user interface screen and "fourth" user interface screen are used to indicate any change or changes from the "first" user interface screen and the "second" user interface screen determined at block 512 and displayed at block 516. As such, in some embodiments, the third user interface screen and the fourth user interface screen may be very similar to the first user interface screen and the second user interface screen, respectively, but with changes that provide a displayed response to the user inputs discussed below. The method 500 then proceeds to block 524 where the fourth user interface screen(s) are sent to the second IHS, and block 526 where the third user interface screen(s) are displayed on the first display device and the fourth user interface screen(s) are displayed on the second display device.

Referring first to FIGS. 7c and 8a, the user interface was displayed using the first user interface screen 614 on the first display device 602 and the second user interface screen 708 on the second display device 702. At decision block 518, the master screen agent 610 may use the user input received at decision block 518, device information received from the slave IHS 600 at block 510, device information about the master IHS 700, and/or other information known in the art to determine how to provide the response of the user interface to the user input on both the first display device 602 and the second display device 702. As such, the master screen agent determines a third user interface screen (or a plurality of third user interface screens) to replace the first user interface screen 614, and a fourth user interface screen (or a plurality of fourth user interface screens) to replace the second user interface screen 708. The master screen agent 610 then creates a third screen task that includes instructions (e.g., configuration script) for displaying the third user interface screen (or plurality of third user interface screens), and a fourth screen task that includes instructions (e.g., configuration script) for displaying the fourth user interface screen (or plurality of fourth user interface screens). At block 524, the master screen agent 610 provides the fourth screen task to the screen sub-agent 704 in the slave IHS 700.

At block 526, the master screen agent 610 executes the third screen task to display the third user interface screen (or plurality of third user interface screens) on the first display device 602, and the screen sub-agent 704 executes the fourth screen task to display the fourth user interface screen (or plurality of fourth user interface screens) on the second display device 702. In an embodiment, the master screen agent 610 may share any screen tasks that are created with each slave IHS in the multi-chassis display coordination system.

In one example, referring to FIGS. 7c and 8a, at block 518 the user 800 may provide a swipe user input across either or both of the first display device 602 and the second display device 702, and the third user interface screen(s) and fourth user interface screen(s) will be displayed on the first display device 602 and the second display device 702 to provide a coordinated display of the response of the user interface to that user input (e.g., the coordinated movement or scrolling of text across both the first display device 602 and the second display device 702.) In another example, referring to FIGS. 7e and 8b, at block 526 the user 800 may provide a tap user input on the virtual keyboard displayed using the second user interface screen 712 on the second display device 702, and the third user interface screen(s) and fourth user interface screen(s) will be displayed on the first display device 602 and the second display device 702 to provide a coordinated display of the response of the user interface to that user input (e.g., an indication on the virtual keyboard of which key the user has selected, and the display of a character that the user has selected in the input box.) While a few examples of the display of third and fourth user interface screens for a user interface response to a user input have been provided, one of skill in the art in possession of the present disclosure will recognize that a wide variety of responses may be provided by the coordinated display of third and fourth user interface screens while remaining within the scope of the present disclosure.

Following the display of the third user interface screen on the first display device and the fourth user interface screen on the second display device at block 526, or following the determination at decision block 518 that no user input has been received, the method 500 may proceed to decision block 528 where it is determined whether an IHS has been disconnected. In an embodiment, either or both of the master screen agent 610 in the master IHS 600 and the screen sub-agent 704 in the slave IHS 700 may operate at decision block 528 to monitor the their connection to each other and determine whether that connection no longer exists. Similarly as discussed above, any number of screen sub-agents in slave IHSs may be monitored by the master screen agent, and vice versa, to determine if any of the IHSs in the multi-chassis display coordination system have been disconnected. If, at decision block 528, the master IHS 600 and the slave IHS 700 have not been disconnected, the method 500 returns to decision block 518.

If at decision block 528, the master IHS 600 and the slave IHS 700 have been disconnected, the method 500 may proceed based on which of those IHSs is left in the IHS/chassis enclosure 200. For example, if at decision block 528 the slave IHS 700 is removed from the IHS/chassis enclosure 200, the master screen agent will detect the disconnection of the slave IHS 700 and the method 500 will skip optional block 530 (discussed below). The method 500 will then proceed to block 532 where a user interface screen is determined for the user interface, and then to block 534 where the user interface screen is displayed on the first display device. In an embodiment, block 532 may be performed by the master screen agent 610 substantially as described above with reference to block 504 and illustrated in FIGS. 6*b*, 6*c*, and 6*d*. Thus, following blocks 532 and 534, the user interfaces provided using the first user interface screens on the first display device 602 and second user interface screens on the second display device 702 illustrated in FIGS. 7*c*, 7*d*, and 7*e*, may be provided using the user interface screens on the first display device 602 illustrated in FIGS. 6*b*, 6*c*, and 6*d*. In other words, the addition of the slave IHS 700 to the multi-chassis display coordination system provides for the display of the user interfaces across the first display device 602 and the second display device 702, while the removal of the slave IHS 700 from the system returns the display of the user interface to only the first display device 602. One of skill in the art in possession of the present disclosure will recognize that when there are more than two IHSs with more than two display devices in the multi-chassis display coordination system, the removal of a slave IHS will result in the master screen agent determining a number of user interface screens according to the number of display devices available.

In addition, the storage and sharing of received user inputs (or any other data in the transaction journal history, discussed above) at block 520 may allow for the use of those user inputs to provide the user interface in the event an IHS is disconnected at decision block 528. For example, any user inputs shared by the screen sub-agent 704 with the master screen agent 610 may be saved by the master screen agent 610 and then used to determine the user interface screen at block 532 that is then displayed on the first display device 602 at block 534. As such, if a user input is provided on the second display device 702, and then the slave IHS 700 is disconnected from the master IHS 700, the user interface screen determined by the master screen agent at block 532 and displayed at block 534 may include that user input such that the user is not required to provide that user input again. The method 500 may then return to block 508. In one specific example, a user may be in the process of entering an IP address when the slave IHS is removed from the IHS rack 200. When the user interface screen(s) are re-determined, any information about the IP address entered prior to the removal of the slave IHS has been saved and shared, and will be provided on the user interface screen(s) that are re-determined and displayed on the remaining display devices such that the user can resume entering the IP address and does not have to restart navigation through the user interface or reenter any data.

In another example, if at decision block 528 the master IHS 600 is removed from the IHS/chassis enclosure 200, the screen sub-agent 704 will detect the disconnection of the master IHS 600 and the method 500 proceed to optional block 530 where a new master screen agent is elected. In the illustrated embodiment where the slave IHS 700 is the only other IHS with a display device, the screen sub-agent 704 will become an elected master screen agent that is configured to perform any of the master screen agent functions discussed above, and the slave IHS 700 becomes an elected master IHS. The method 500 then proceeds to block 532 where a user interface screen is determined for the user interface, and then to block 534 where the user interface screen is displayed on a display device. In an embodiment, block 532 may be performed by the elected master screen agent in the substantially as described above with reference to block 504 and illustrated in FIGS. 6*b*, 6*c*, and 6*d*. Thus, following blocks 532 and 534, the user interfaces provided using the first user interface screens on the first display device 602 and second user interface screens on the second display device 702 illustrated in FIGS. 7*c*, 7*d*, and 7*e*, may be provided using user interface screens on the second display device 702 that are substantially similar to those illustrated on the first display device 602 in FIGS. 6*b*, 6*c*, and 6*d*. In other words, the addition of the slave IHS 700 to the system provides for the display of the user interfaces across the first display device 602 and the second display device 702, while the removal of the master IHS 600 from the system provides for the display of the user interface on only the second display device 702.

In addition, the storage and sharing of received user inputs at block 520 may allow for the use of those user inputs to provide the user interface in the event an IHS is disconnected at decision block 528. For example, any user inputs shared by the master screen agent 610 with the screen sub-agent 704 may be saved by the screen sub-agent 704 and then used (as the elected master screen agent) to determine the user interface screen at block 532 that is then displayed on the second display device 702 at block 534. Similarly as described above, if a user input is provided on the first display device 602, and then the master IHS 700 is disconnected from the slave IHS 600, the user interface screen determined by the elected master screen agent at block 532 and displayed at block 534 may include that user input such that the user is not required to provide that user input again. The method 500 may then return to block 508.

Thus, systems and methods have been described that provide for the coordinated display on display devices of different IHSs having different processing systems that are separate but interconnected. The systems and methods allow for the dynamic adjustment of the display of, for example, a user interface on one or more displays as those displays are added and removed from the system. User inputs to one or more of those displays may cause those displays to respond in a coordinated manner as well, and user inputs may be saved and shared across IHSs such that disconnection of an IHS from the system does not require a user to provide those user inputs a second time.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-chassis coordinated display system, comprising:
   a first chassis that is configured to be housed in a chassis enclosure that includes a backplane having a plurality of Information Handling System (IHS) connectors;
   a first backplane connector that is included on the first chassis and that is configured to couple to the backplane in the chassis enclosure through a first IHS connector of the plurality of IHS connectors when the first chassis is housed in the chassis enclosure;
   a first display device located on the first chassis;
   a first processing system housed in the first chassis and coupled to the first display device and the first backplane connector; and
   a first memory system housed in the first chassis and including instructions that, when executed by the first processing system, cause the first processing system to provide a master screen agent that is configured to:

receive device information through the backplane from a screen sub-agent that is provided by a second processing system and a second memory system that are:
   located in a second chassis that is housed in the chassis enclosure;
   coupled to a second display device that is located on the second chassis; and
   coupled to a second backplane connector that is included on the second chassis and that is coupled to the backplane through a second IHS connector of the plurality of IHS connectors;
use the device information to determine a relative positioning of the first display device and the second display device;
use at least the relative positioning of the first display device and the second display device to generate a first user interface screen for a user interface and a second user interface screen for the user interface;
send the second user interface screen to the screen sub-agent via the backplane; and
display the first user interface screen on the first display device, wherein the display of the first user interface screen by the master screen agent on the first display device and the display of the second user interface screen by the screen sub-agent on the second display device results in a coordinated display of the user interface on the first display device and the second display device.

2. The multi-chassis coordinated display system of claim 1, wherein the master screen agent is configured to:
use the device information to determine dimensions of the second display device;
use at least the relative positioning of the first display device and the second display device and the dimensions of the second display device to generate the first user interface screen for the user interface and the second user interface screen for the user interface.

3. The multi-chassis coordinated display system of claim 1, wherein the master screen agent is configured to:
detect disconnection of the screen sub-agent from the master screen agent;
determine a third user interface screen for the user interface; and
display the third user interface screen on the first display device, wherein the display of the third user interface screen by the master screen agent on the first display device results in a display of the user interface on only the first display device.

4. The multi-chassis coordinated display system of claim 1, wherein the determining the second user interface screen includes:
creating a screen task that includes instructions for displaying the second user interface screen; and
sending the screen task through the backplane to the screen sub-agent, wherein performance of the screen task by the screen sub-agent results in the display of the second user interface screen on the second display device.

5. The multi-chassis coordinated display system of claim 1, wherein the master screen agent is configured to:
receive a user input on at least one of the first display device and the second display device;
store the user input; and
send the user input through the backplane to the screen sub-agent, wherein disconnection of the master screen agent from the screen sub-agent causes the screen sub-agent to become an elected master screen agent, and wherein the user input allows the elected master screen agent to determine a third user interface screen and display the third user interface screen on the second display device, and wherein the display of the third user interface screen by the elected master screen agent on the second display device results in a display of the user input.

6. The multi-chassis coordinated display system of claim 1, wherein the master screen agent is configured to:
receive a user input on the first display device;
use the user input to determine a third user interface screen and a fourth user interface screen;
send the fourth user interface screen through the backplane to the screen sub-agent; and
display the third user interface screen on the first display device, wherein the display of the third user interface screen by the master screen agent on the first display device and the display of the fourth user interface screen by the screen sub-agent on the second display device results in the coordinated display of a response of the user interface to the user input on the first display device and the second display device.

7. The multi-chassis coordinated display system of claim 1, wherein the master screen agent is configured to:
receive a user input on the second display device from the screen sub-agent;
use the user input to determine a third user interface screen and a fourth user interface screen;
send the fourth user interface screen through the backplane to the screen sub-agent; and
display the third user interface screen on the first display device, wherein the display of the third user interface screen by the master screen agent on the first display device and the display of the fourth user interface screen by the screen sub-agent on the second display device results in the coordinated display of a response of the user interface to the user input on the first display device and the second display device.

8. An information handling system (IHS), comprising:
an IHS enclosure;
a backplane that is located in the IHS enclosure;
a slave IHS that is located in the IHS enclosure, that is coupled to the backplane, and that includes a slave display device and a slave processing system that provides a screen sub-agent; and
a master IHS that includes a master display device, that is located in the IHS enclosure, and that is coupled to the backplane such that the master display device is located adjacent the slave display device, wherein the master IHS includes a master processing system that provides a master screen agent that is coupled to the screen sub-agent through the backplane and that is configured to:
receive device information through the backplane from the screen sub-agent;
use the device information to determine relative positioning of the master display device and the slave display device;
use at least the relative positioning of the master display device and the slave display device to generate a first user interface screen for a user interface and a second user interface screen for the user interface;
send the second user interface screen through the backplane to the screen sub-agent; and display the first user interface screen on the master display device;
wherein the screen sub-agent is configured to:
display the second user interface screen on the slave display device, wherein the display of the first user interface screen by the master agent on the master display device and the display of the second user interface screen by the screen sub-agent on the slave display device results in a coordinated display of the user interface on the master display device and the slave display device.

9. The IHS of claim 8, wherein the master screen agent is configured to:
detect disconnection of the screen sub-agent from the master screen agent;
determine a third user interface screen for the user interface; and
display the third user interface screen on the master display device, wherein the display of the third user interface screen by the master screen agent on the master display device results in a display of the user interface on only the master display device.

10. The IHS of claim 8, wherein the determining of the second user interface screen includes:
creating a screen task that includes instructions for displaying the second user interface screen; and
sending the screen task through the backplane to the screen sub-agent, wherein performance of the screen task by the screen sub-agent results in the display of the second user interface screen on the slave display device.

11. The IHS of claim 8, wherein the master screen agent is configured to:
receive a user input on at least one of the master display device and the slave display device;
store the user input; and
send the user input through the backplane to the screen sub-agent, wherein disconnection of the master screen agent from the screen sub-agent causes the screen sub-agent to become an elected master screen agent, and wherein the user input allows the elected master screen agent to determine a third user interface screen and display the third user interface screen on the slave display device, and wherein the display of the third user interface screen by the elected master screen agent on the slave display device results in a display of the user input.

12. The IHS of claim 8, wherein the master screen agent is configured to:
receive a user input on the master display device;
use the user input to determine a third user interface screen and a fourth user interface screen;
send the fourth user interface screen through the backplane to the screen sub-agent; and
display the third user interface screen on the master display device; and
wherein the screen sub-agent is configured to:
display the fourth user interface screen on the slave display device, wherein the display of the third user interface screen by the master screen agent on the master display device and the display of the fourth user interface screen by the screen sub-agent on the slave display device results in the coordinated display of a response of the user interface to the user input on the master display device and the slave display device.

13. The IHS of claim 8, wherein the master screen agent is configured to:
receive a user input on the slave display device;
use the user input to determine a third user interface screen and a fourth user interface screen;
send the fourth user interface screen through the backplane to the screen sub-agent; and
display the third user interface screen on the master display device; and
wherein the screen sub-agent is configured to:
display the fourth user interface screen on the slave display device, wherein the display of the third user interface screen by the master screen agent on the master display device and the display of the fourth user interface screen by the screen sub-agent on the slave display device results in the coordinated display of a response of the user interface to the user input on the master display device and the slave display device.

14. A method for a multi-chassis coordinated display interaction, comprising:
receiving, through a backplane in a chassis enclosure by a master screen agent provided by a first processing system that is coupled to the backplane and a first display device on a first chassis that is housed in the chassis enclosure, device information from a screen sub-agent provided by a second processing system that is coupled to the backplane and a second display device on a second chassis that is housed in the chassis enclosure;
using, by the master screen agent, the device information to determine relative positioning of the first display device and the second display device;
using, by the master screen agent, at least the relative positioning of the first display device and the second display device to generate a first user interface screen for a user interface and a second user interface screen for the user interface;
sending, by the master screen agent through the backplane, the second user interface screen to the screen sub-agent; and
displaying, by the master screen agent, the first user interface screen on the first display device, wherein the display of the first user interface screen by the master screen agent on the first display device and the display of the second user interface screen by the screen sub-agent on the second display device results in a coordinated display of the user interface on the first display device and the second display device.

15. The method of claim 14, further comprising:
using, by the master screen agent, the device information to determine dimensions of the second display device;
using, by the master screen agent, at least the relative positioning of the first display device and the second display device and the dimensions of the second display device to generate the first user interface screen for the user interface and the second user interface screen for the user interface.

16. The method of claim 14, further comprising:
detecting, by the master screen agent, disconnection of the screen sub-agent from the master screen agent;
determining, by the master screen agent, a third user interface screen for the user interface; and
displaying, by the master screen agent, the third user interface screen on the first display device, wherein the display of the third user interface screen by the master screen agent on the first display device results in a display of the user interface on only the first display device.

17. The method of claim 14, wherein the determining of the second user interface screen includes:
   creating, by the master screen agent, a screen task that includes instructions for displaying the second user interface screen; and
   sending, by the master screen agent through the backplane, the screen task to the screen sub-agent, wherein performance of the screen task by the screen sub-agent results in the display of the second user interface screen on the second display device.

18. The method of claim 14, further comprising:
   receiving, by the master screen agent, a user input on at least one of the first display device the second display device;
   storing, by the master screen agent, the user input; and
   sending, by the master screen agent through the backplane, the user input to the screen sub-agent, wherein disconnection of the master screen agent from the screen sub-agent causes the screen sub-agent to become an elected master screen agent, and wherein the user input allows the elected master screen agent to determine a third user interface screen and display the third user interface screen on the second display device, and wherein the display of the third user interface screen by the elected master screen agent on the second display device results in a display of the user input.

19. The method of claim 14, further comprising:
   receiving, by the master screen agent, a user input on the first display device;
   using, by the master screen agent, the user input to determine a third user interface screen and a fourth user interface screen;
   sending, by the master screen agent through the backplane, the fourth user interface screen to the screen sub-agent; and
   displaying, by the master screen agent, the third user interface screen on the first display device, wherein the display of the third user interface screen by the master screen agent on the first display device and the display of the fourth user interface screen by the screen sub-agent on the second display device results in the coordinated display of a response of the user interface to the user input on the first display device and the second display device.

20. The method of claim 14, further comprising:
   receiving, by the master screen agent, a user input on the second display device from the screen sub-agent;
   using, by the master screen agent, the user input to determine a third user interface screen and a fourth user interface screen;
   sending, by the master screen agent through the backplane, the fourth user interface screen to the screen sub-agent; and
   displaying, by the master screen agent, the third user interface screen on the first display device, wherein the display of the third user interface screen by the master screen agent on the first display device and the display of the fourth user interface screen by the screen sub-agent on the second display device results in the coordinated display of a response of the user interface to the user input on the first display device and the second display device.

\* \* \* \* \*